United States Patent [19]

Robishaw et al.

[11] Patent Number: 4,928,616
[45] Date of Patent: May 29, 1990

[54] CONSTRUCTION TRANSPORATION SYSTEM

[75] Inventors: Alces P. Robishaw; Paul A. Robishaw, both of Houston, Tex.

[73] Assignee: Robishaw Engineering, Inc., Houston, Tex.

[21] Appl. No.: 323,344

[22] Filed: Mar. 14, 1989

Related U.S. Application Data

[60] Division of Ser. No. 70,348, Jul. 7, 1987, Pat. No. 4,811,681, which is a continuation of Ser. No. 757,631, Jul. 22, 1985, abandoned, which is a continuation-in-part of Ser. No. 642,181, Aug. 17, 1984, Pat. No. 4,610,215.

[51] Int. Cl.$^5$ .............................................. B60P 7/13
[52] U.S. Cl. .................................... 114/267; 414/786
[58] Field of Search ................................ 114/26–28, 114/249, 266, 267, 77 A, 77 R; 280/408, DIG. 8; 52/585, 587; 14/2.6, 27, 75; 405/203, 204, 218, 219; 410/78; 414/786, 139; 220/1.5, 23.6

[56] References Cited

U.S. PATENT DOCUMENTS

| | | | |
|---|---|---|---|
| 2,876,726 | 3/1959 | Robishaw | 114/267 |
| 3,057,315 | 10/1962 | Robishaw | 114/267 |
| 3,061,134 | 10/1962 | Fesmire et al. | 280/DIG. 8 |
| 3,132,883 | 5/1964 | Tantlinger et al. | 280/DIG. 8 |
| 3,691,974 | 9/1972 | Seiford, Sr. et al. | 114/267 |
| 3,799,100 | 2/1976 | Marriner | 114/230 |
| 3,805,721 | 4/1974 | Robishaw | 114/266 |
| 3,818,854 | 6/1974 | Marriner | 114/235 R |
| 3,822,667 | 7/1974 | Marriner | 114/235 R |
| 3,827,407 | 8/1974 | Stratienko et al. | 114/235 R |
| 3,938,461 | 4/1974 | Marriner | 114/230 |
| 4,060,048 | 11/1977 | Breheret et al. | 114/266 |
| 4,290,382 | 9/1981 | Conti et al. | 114/266 |
| 4,339,148 | 7/1980 | Smith et al. | 114/266 |
| 4,431,368 | 2/1984 | Katz et al. | 414/786 |

FOREIGN PATENT DOCUMENTS 2725060 12/1978 Fed. Rep. of Germany ...... 114/249

Primary Examiner—Joseph F. Peters, Jr.
Assistant Examiner—Edwin L. Swinehart
Attorney, Agent, or Firm—Browning, Bushman, Anderson & Brookhart

[57] ABSTRACT

A construction transportation system comprises at least one transport assembly having gross dimensions generally corresponding to those of a standard freight container. The transport assembly comprises at least two construction components. Each of the two construction components has a first gross dimension whose maximum value is generally equal to $C_1/x$, where $C_1$ is the width of a standard freight container, and x is greater than or equal to 1. Each of the two components has a second gross dimension perpendicular to the first dimension whose maximum value is generally equal to $C_2/y$, where $C_2$ is the length of a standard freight container, and y is greater than 1. Each of the two components has a third gross dimension perpendicular to the first and second dimensions. At least a first side of each of the two components extends in the directions of that components' first and third dimensions, and that first side is provided with connectors. The first sides of the two components are connected, in opposed relation, by the connectors in said transport assembly.

4 Claims, 10 Drawing Sheets

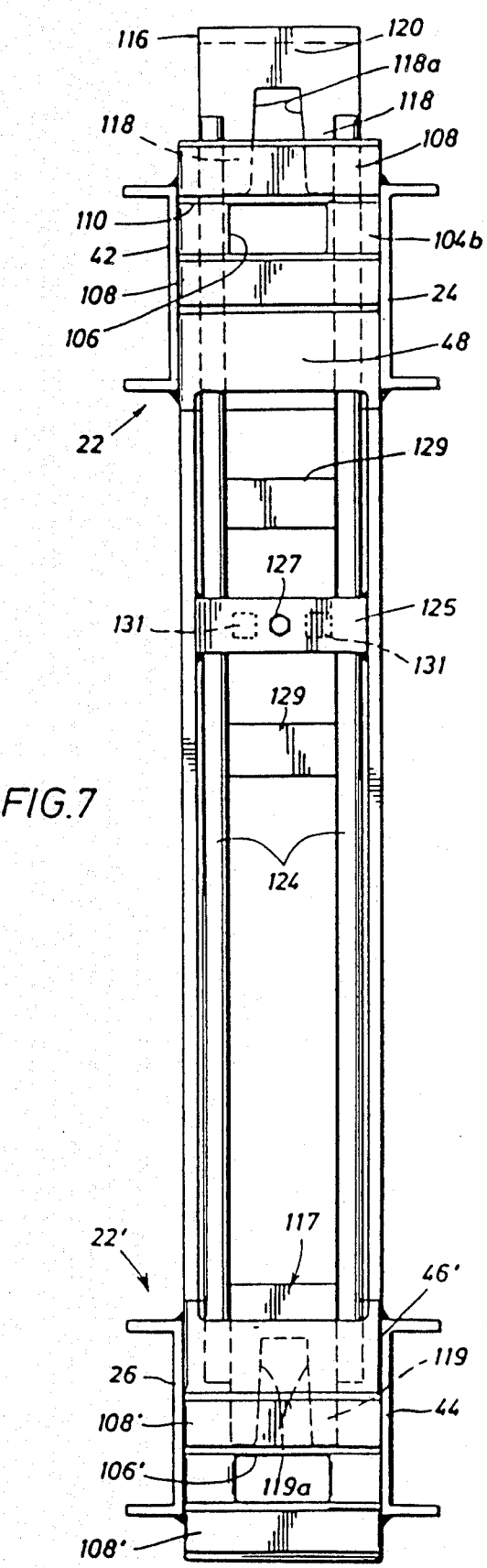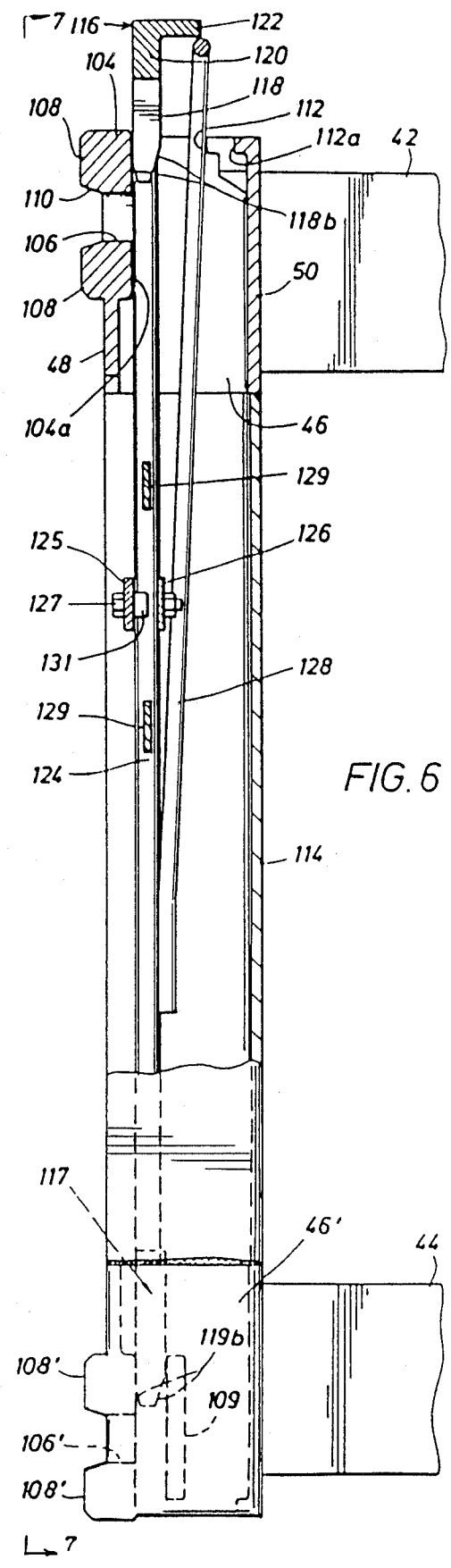
FIG. 7
FIG. 6

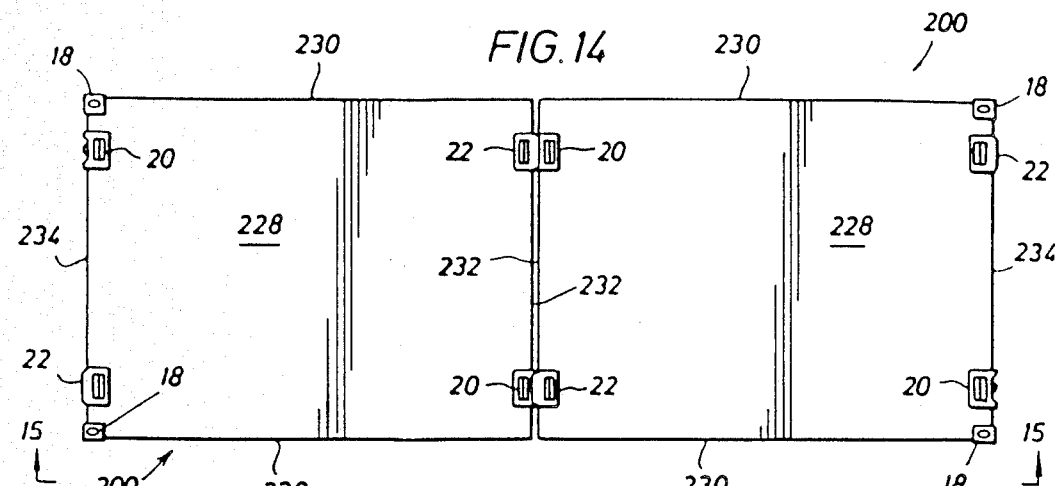
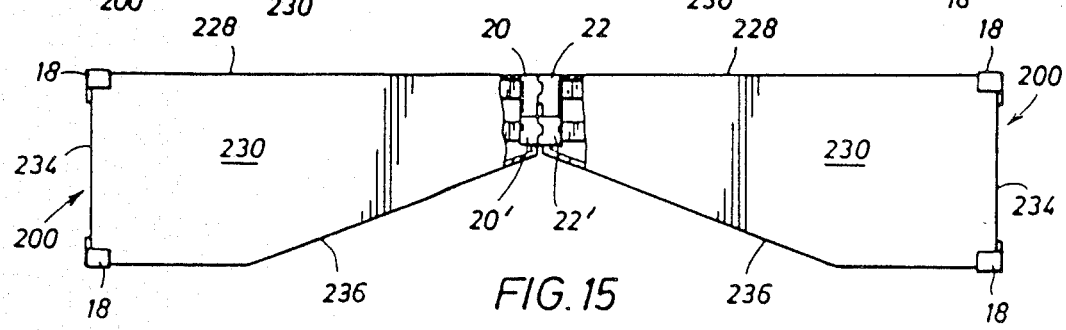
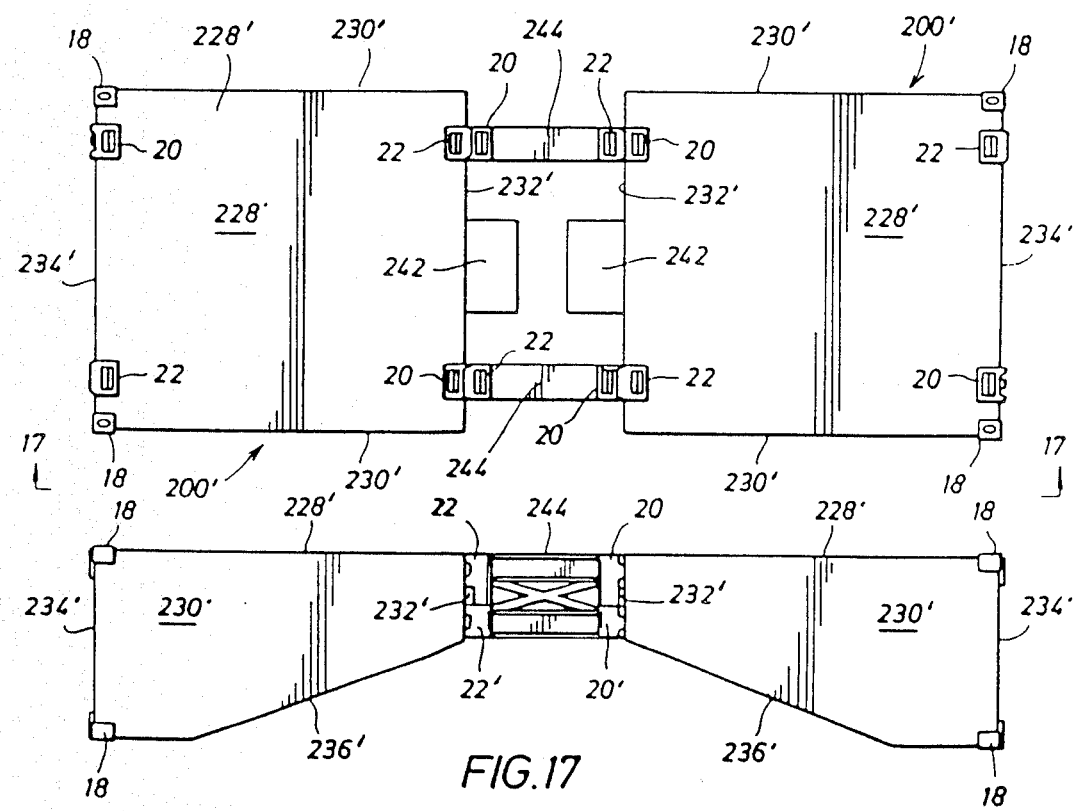

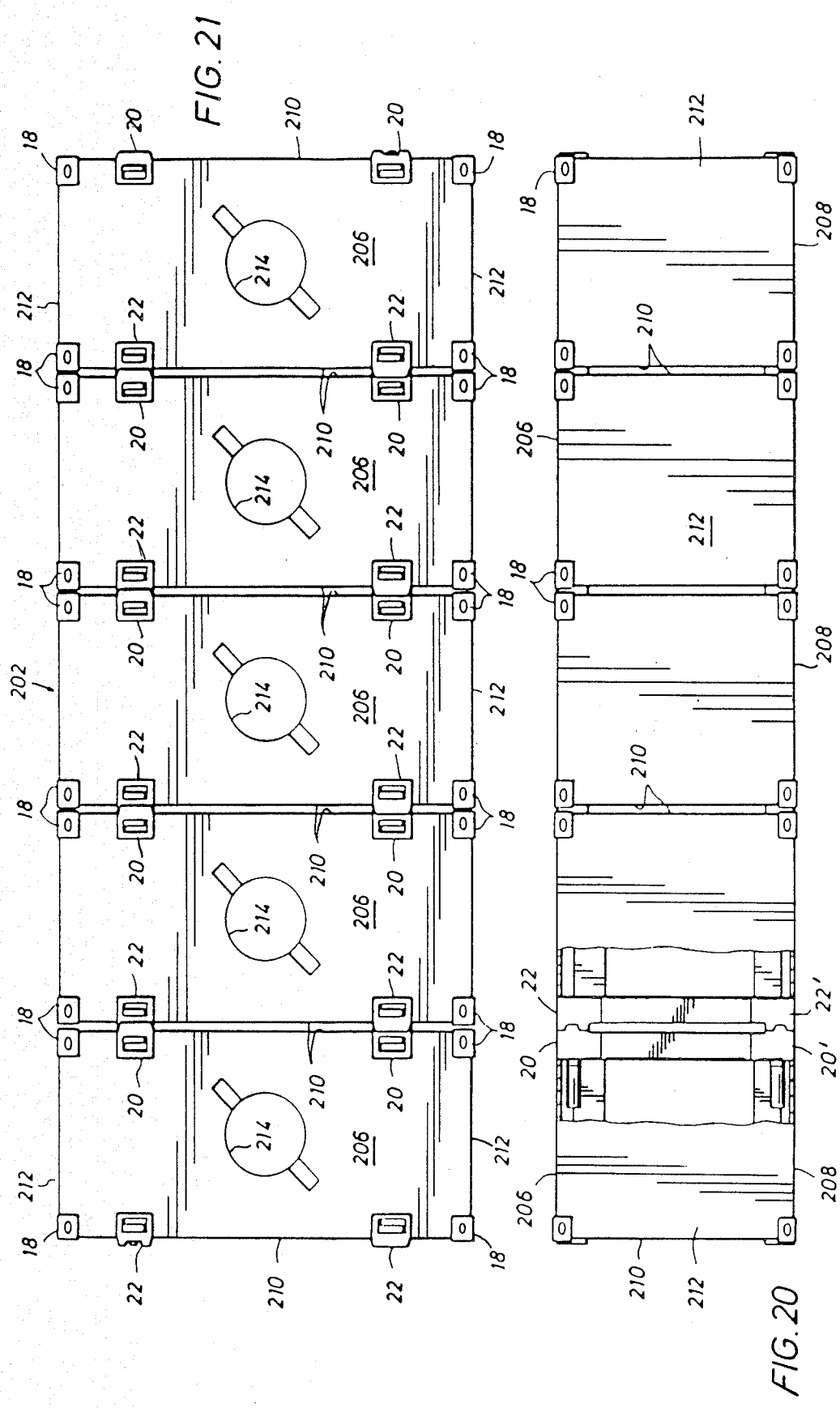

CONSTRUCTION TRANSPORATION SYSTEM

CROSS REFERENCE

This is a division, of Application Ser. No. 070.348, filed July 7, 1987, now U.S. Pat. Ser. No. 4,811,601 which is a continuation of U.S. Ser. No. 757,631 filed July 22, 1985, now abandoned, which in turn is a continuation-in-part of Ser. No. 642,181 filed Aug. 17, 1984, now U.S. Pat. Ser. No. 4,610,215.

BACKGROUND OF THE INVENTION

The present invention pertains to construction components which may be locked together in various configurations for transportation and/or to form structures such as bridges, platforms, and the like. Prior U.S. Pat. Ser. No. 2,876,726, No. 3,057,315, and No. 3,805,721 describe a series of successive developments in such construction components and special locks therefore. The present invention provides further improvements in such construction components. However, while the inventions of said prior patents are described in the context of buoyant construction components, such as are used to form barges, floating platforms, floating bridges, and the like, it is contemplated that the present invention may be applied not only to such buoyant components but also to components for forming non-floating structures such as earth supported bridges, earth supported platforms, etc.

In modern international commerce, there is widespread use of what are termed "standard freight containers." Such a container is generally in the form of a rectangular parallelepiped. It not only has standardized external dimensions, but in addition, usually includes a standard form of fitting which may be engaged by standardized tools and the like for both lifting and moving the container, and for lashing it in place in various locations. Freight handling facilities, e.g. at seaports, throughout the world, have been equipped with such standardized lifting and moving equipment, whereas freight vehicles, such as ships, have been equipped with standard sized racks used in aligning and retaining such containers. Such standardization, on an international scale, has vastly facilitated the shipping and handling of many types of freight which can be packed in the containers.

Coinciding with the above developments in freight handling equipment and practices, is the need for transporting construction components of the type generally exemplified by the aforementioned prior U.S. patents to the locations at which they will be used. Such transport could be greatly facilitated and the cost thereof reduced if the construction components could be handled and shipped in the same manner as standard freight containers.

The generally rectangular parallelepiped configuration of such prior art components would readily lend itself to such handling, but problems are presented by the fact that the lock assemblies carried by the components include protruding pin members. Thus, for example, if the gross dimensions of such a component, measured between the outer surfaces of its walls, were sized to correspond to those of a standard freight container, the pins of the lock assemblies would protrude beyond such standardized profile or gross dimensions, and thereby prevent the component from being placed in the standardized racks typically provided on freighters. On the other hand, if the construction component were sized so that its dimensions, measured to the outer ends of the lock pins, would correspond to those of a standard freight container, the gross dimensions, measured between the outer surfaces of the walls, would then be too small to enable the component to be properly held in such racks.

Furthermore, even if the components are not to be handled or shipped as standard freight containers, it would be preferable to eliminate the protruding pins in any transport or storage situation, not only for the most economic use of space, but also for the protection of the pins themselves and other structures, apparatus, or even personnel which the pins might strike in the course of handling.

In a typical construction system of the type generally contemplated, a majority of the construction components would typically be of the type generally disclosed in the aforementioned prior U.S. patents, i.e. large "building blocks" of a relatively simple parallelepiped form. However, in most installations or constructions, there is also need for certain relatively specialized components, e.g. components adapted to take load bearing pilings or holding spuds, and/or components having raked or ramp-like tapers at one end. Such modifications to the basic construction components are often expensive, and in addition, may present additional problems in the context of transporting and handling the modified components. For example, the modifications of the components may cause them to include protrusions or deviations from rectangular parallelepiped gross profile, whereby they cannot be readily handled as standard freight containers.

Another area for potential improvement revolves around the fact that, when such construction components are locked together to form a given structure, many different types of loads may be imposed thereon. For example, where the components are assembled to form a floating structure, one of the greatest forces is a vertical shear-type force exerted by virtue of the fact that one component tends to rise or fall with respect to another due, for example, to wave action and/or to the passage of motor vehicles from one component to the next across the upper surface of the overall structure. Another significant type of force is a horizontally directed tensile force exerted by virtue of the tendency of the connected components to separate. There are also transverse horizontal shear-type forces, which generally represent a somewhat less serious problem than the transverse vertical shear forces.

In the structures disclosed in the aforementioned prior U.S. patents, when two components are locked together, the transfer of all of these various forces from one component to the next involves the pin members of the male lock assemblies. Thus, the dimensions of these pin members are a limiting factor on the magnitude of forces which can be handled. The ramifications of this limitation in turn include not only limits on the uses to which such components can be put, but also limits on the size of the components themselves, given a specific pin size.

Yet another area for potential improvement relates to the fact that, in many situations, it is desirable, or even necessary, that the workers who assemble the construction components to form a completed structure stand on those very components as they are being connected together. When the components are buoyant, and are connected together while floating on a body of water, the problems are further complicated. Thus, it is extremely important that the lock systems be easy to use, requiring only a few simple motions with simple hand tools. In general, the aforementioned U.S. Pat. Ser. No. 2,876,726, No. 3,057,315, and No. 3,805,721 meet these needs quite well. However, when the workers stand, as they naturally would, near the component wall at which the connections are to be made, and if the components are floating, then the components tend to rock or tip downwardly at said adjacent walls, which tends to splay the lower edges of said walls making it difficult to mate the connectors along said lower edges.

There have been attempts to address the various problems discussed above, but they have not been completely satisfactory. In particular, there have been suggestions that pontoons or the like could be sized to generally correspond to standard freight containers. These devices have been designed with locks substantially different from the type described and illustrated in the aforementioned prior U.S. patents.

German Patent Publications No. 2725060 and No. 2651247 are exemplary. The lock structures illustrated therein do not employ horizontally extending pin members carried by the components to be connected. Rather, the components must be brought together so that recesses in the two components are properly aligned, and then a separate pin member is inserted into the aligned recesses in a vertical directional mode, the pin member and recesses being configured so as to effect connection of the two components.

This system suffers from several disadvantages. First, in what may have been an effort to devise a locking arrangement which would not include parts protruding substantially beyond the gross dimensions of the structural component, a form of locking system has been chosen which differs substantially from the type of lock generally described and illustrated in prior U.S. Pat. Ser. No. 2,876,726, No. 3,057,315 and No. 3,805,721. This is undesirable because the general type of lock disclosed in said prior U.S. patents has proven, over many years of use, to be particularly effective, reliable, easy to use, and otherwise highly successful in the connection of construction components, particularly for floating structures, for which use this last-mentioned locking scheme was specially developed. It is undesirable to sacrifice these proven and highly successful features of the locks exemplified by the prior U.S. patents by going to the less effecting locking scheme exemplified by the aforementioned German patent publications.

Another problem with the type of structure exemplified by the German patent publications is that the locking system requires a completely separate insertable pin member. These pin members must be separately carried and stored, and therefore they are susceptible to being lost, misappropriated by workers for use as make-shift tools, or otherwise disposed of so that, when the time comes to connect the structural components to form a structure, the pin members either cannot be located, or have been damaged.

Still another problem with this type of prior art scheme is that, due to the elimination of any part which extends a substantial distance horizontally from the side walls of the construction component, there is no effective structural guidance for bringing two such components into proper alignment, and maintaining them so aligned, so that the pin member can be inserted into the aligned recesses in order to complete the lock. This can be a particular problem when it is necessary to connect such components while they are floating on a body of water.

In some instances, structures somewhat similar to those disclosed in the German patent publications have further been provided with mating lugs and recesses projecting and receiving in a generally horizontal direction, but by a distance small enough not to interfere with the handling of the structural component in the manner of a standard freight container. Because of this very limited horizontal extent, these lugs and recesses do not really provide a great deal of assistance with the alignment problem described above. In short, the components must be fairly closely aligned before the lugs and recesses can be engaged. It is believed that such lugs and recesses probably were not provided primarily to serve as guides in aligning the components, but rather, may have been provided to bear the shear loads between the components, since the vertically arranged pin and recess scheme does not include any means for doing so.

Still another scheme for connecting pontoons is disclsoed, in various embodiments, in the following U.S. patents: No. 3,799,100; No. 3,818,854; No. 3,822,667; No. 3,938,461; and No. 4,290,382. The last-mentioned patent generally corresponds to at least one known commercial embodiment of such scheme. One of the main features of this scheme is that it is specifically designed to provide a hinging-type action or articulation between the connected pontoons about a horizontal axis. All of the connectors on a given side of the pontoon are horizontally aligned on the same level. Furthermore, as best shown in the first four patents listed above, the pin members of the locks have flexible elastomeric sections bridging gaps between adjacent pontoons to allow for such articulation. The last listed patent, U.S. Pat. Ser. No. 4,290,382, further discloses the provision of separate shear bearing formations. These formations define generally cylindrical shear bearing surfaces, with the axes of the cylinders disposed horizontally and aligned with the pin-type connectors so as to form large hinges.

This type of connection scheme, and the hinging action specifically provided thereby, are unacceptable in construction components for forming such structures as bridges, drilling platforms, etc. Furthermore, the connectors are so large and unwieldy that they cannot be manually moved, even with hand tools, but rather, require the use of large, heavy duty power tools such as motorized winches. Likewise, the extremely large connector elements, e.g. the shear bearing formations which protrude substantially from the sides of the pontoons, effectively eliminate the possibility of sizing and handling the pontoons as standard freight containers.

SUMMARY OF THE INVENTION

The present invention utilizes many general principles of lock systems disclosed in prior U.S. Pat. Ser. No. 2,876,726, No. 3,057,315, and No. 3,805,721, with their proven advantages and success in connecting construction components, buoyant or otherwise, but with further improvements which address the various problems discussed above in connection with the prior art.

One aspect of the present invention is the provision of a construction/transportation system comprising a plurality of construction components. Although many types of construction components are within the scope of the present invention, at least three basic types are specifically disclosed herein. These are: (1) the general construction component, a fairly simple component of generally rectangular parallepiped form, which forms one of the basic building blocks of the construction system; (2) rake components, whose undersides are graduated or tapered, e.g. for use at the ends of a bridge which rest on the opposite shores being bridged or on the ends of docks or piers; and (3) spud well components, which are adapted to receive elongate spuds of either the load bearing or locating type, and which can be connected to the other components to adapt them for appropriate association with load bearing or locating spuds.

A general construction component of the present invention has thereon a plurality of male and female lock assemblies, generally similar to the lock assemblies disclosed in the aforementioned prior U.S. patents, adapted for engagement with respective female and male lock assemblies of a similar construction component for locking the two components together. One of the main differences between the locking system of the present invention and those of the aforementioned prior U.S. patents is that, in each of the male lock assemblies, the generally horizontally disposed pin member is reciprocable with respect to the construction component between an advanced position in which it protrudes significantly from a lateral wall of that component and a retracted position in which it lies generally within the gross dimensions of the component (i.e. in which it does not protrude from the component by a distance sufficient to interfere with its handling in the manner of a standard freight container). Accordingly, the gross dimensions of the component may be chosen to generally correspond to those of a standard freight container.

Thus, for shipping and handling, the pin members may be disposed in their retracted positions, and the component on which they are carried may further be provided with standard container fittings whereby the container may be lifted, lashed, and otherwise handled in generally the same manner as such freight containers. However, when the construction component has been unloaded at the construction site, the pin members may be placed in their advanced positions, extending substantially outwardly from the side walls of the component, whereby tapered surfaces on the pin members and/or the sockets of the mating female assemblies of another component to be connected may gradually guide the components into a properly aligned position and aid in temporarily maintaining such position, as explained more fully in the aforementioned U.S. patents.

The male lock assemblies of each construction component are arranged in tandem pairs, the two male lock assemblies of each such pair being vertically spaced from each other along a lateral wall of the construction component. The female lock assemblies are similarly arranged in tandem vertical pairs. Furthermore, the pin members of the male lock assemblies are rigid. Thus, the present invention is designed to specifically prevent any substantial hinging action between adjacent connected construction components. Nevertheless, the pin members and other movable parts may be made sufficiently small so as to be manually movable with simple hand tools.

Each of the female lock assemblies includes a female body comprising a female socket means defining a female socket opening adapted for receipt of such a pin member. Further, the female lock assembly includes lock means movable generally transverse to the socket opening between a release position and a locking position for selectively locking the pin member in the female socket means. The male lock assembly, in turn, likewise comprises a lock means similar to that of the female lock assembly which is movable generally transverse to the pin member between a release position and a locking position for selectively locking the pin member in at least one of, but preferably either of, its two positions.

More particularly, the pin member has a head end, a tail end, and two lock engagement regions located between the ends and also spaced from each other along the length of the pin member. The male lock assembly further includes a male body comprising male socket means having front and rear faces and defining a male socket opening extending therethrough in the front-rear directional mode. The pin member is received in this male socket opening for reciprocation relative to the male socket means between its advanced and retracted positions.

When the pin member is in its advanced position, one of its lock engagement regions is disposed forward of the front face of the male socket means by a distance such that, if the pin member is inserted into the socket opening of a female lock assembly of another construction component, this first lock engagement region will be properly positioned for engagement by the lock means of the female lock assembly. At the same time, with the pin member in its advanced position, the second of the lock engagement regions is located behind the rear face of the male socket means so that it is in proper position for engagement by the male lock means for locking the pin member in its advanced position and also transferring rear-to-front loads imposed on the pin member to the male body on which it is carried. When the pin member is in its retracted position, the first lock engagement region thereof is disposed behind the rear face of the male socket means in a position analogous to that of the second lock engagement region when the pin member is in its advanced position. Thus, in the retracted position, the first lock engagement region may be engaged by the male lock means to retain the pin member in the retracted position.

It can thus be seen that the locking system of the present invention provides a scheme which allows the profile of the lock assemblies to be reduced so as not to interfere with shipping and handling of the construction component on which they are carried in the manner of a standard freight container. Nevertheless, after such shipping and handling, substantially horizontally extending pin members may be advanced to provide all of the advantages of the types of lock assemblies generally disclosed in prior U.S. Pat. Ser. No. 2,876,726, No. 3,057,315, and No. 3,805,721.

Furthermore, there are no separate parts which must be separately carried, and therefore could be lost. Rather, the lock assemblies of the present invention are completely self-contained. More particularly, the reciprocable pin members of the male lock assemblies, as well as the reciprocable lock means of both the male and female lock assemblies, are carried on those lock assemblies, and retained against separation therefrom. In addition, the means are provided for so retaining the male and female lock means in raised positions against the force of gravity. This represents a considerable advantage over various other types of prior art locking schemes as described more fully above.

The bodies of the male and female lock assemblies, which include their respective socket means, may also include integral shear bearing formations, projecting and receiving in a generally horizontal directional mode for interengagement when the male and female lock assemblies are mated and locked, so as to transfer shear loads between the connected assemblies independently of the respective pin member. The extent of horizontal projection of any such shear bearing formation need not be so great as to interfere with the aforementioned handling of the construction component in the manner of a standard freight container. Furthermore, although the rigidity of the pin members, and the arrangement of the lock assemblies in vertical tandem pairs prevents hinging action as mentioned hereinabove, the shear bearing formations are preferably configured to further positively resist any such hinging action about a horizontal axis.

By relieving the pin member from shear loading in at least one transverse direction, e.g. vertical, it is possible to make the vertical transverse dimension of the pin member, in the area adjacent the socket means when the pin is advanced and locked into a female assembly, significantly smaller than its transverse horizontal direction. This in turn makes it possible to maximize the distance between the centers of gravity of two tandem pins, thereby increasing the resistance to hinging action. From another point of view, it is possible to substantially increase the transverse horizontal dimension of the pin, to increase its tensile and horizontal shear bearing capacity, without a corresponding increase in transverse vertical dimension. Thus, without an unduly large or heavy pin, larger and heavier construction components may be used, and the manner in which the components are used may be expanded.

Unlike the prior art exemplified by the German patent publications, however, the present invention still makes use of a horizontally extending pin in the male lock assembly and a corresponding socket in the female lock assembly. Therefore, when the pin member is inserted into the female socket, these structures may temporarily bear the vertical shear loads while the lock means are being moved to their locking positions. Again, this represents a tremendous advantage in terms of the ease of assembling the components in actual practice, particularly when the components must be assembled while floating on water.

Even if the components on which the lock assemblies are carried are not sized to correspond generally to standard freight containers, the retractability of the pins of the male lock assemblies is highly desirable, since it makes the lock assemblies, and the components in general, much easier and safer both to handle and store in virtually any situation.

The lock means of each tandem pair of lock assemblies are preferably connected for joint vertical movement. This permits the lower of the two lock assemblies to be operated along with the upper assembly by workers standing on the upper decks of the construction components. To aid in solving the problem of tipping or rocking of the construction components by such workers standing close to the lateral walls on which the lock assemblies are being used, resulting in splaying of the lower ends of those walls, the female lock means of a tandem pair of female lock assemblies are designed so that the lower of the two lock means will engage a pin member inserted in the respective female socket before the upper lock means will engage a like related pin when the two lock means are driven downwardly in unison. The male lock means are similarly designed, but for a different purpose. Specifically, when it is desired to place the pin members of a tandem pair of male lock assemblies in their retracted positions, and lock them in such positions, the lower pin member can h=forced inwardly to its retracted position, the tandem lock means can be jointly lowered until said lower pin is engaged, the upper pin can then be forced to its retracted position, and the lock means can be further lowered to completely engage and lock both pins in their retracted positions. This eliminates the need to manually hold both pins in their retracted positions while the lock means are being lowered.

As compared with the general construction components described above, the specialized construction components of the present invention, specifically the rake components and spud well components, are preferably somewhat smaller than standard freight containers. Nevertheless, it is not practical to place these specialized components within standard freight containers for transportation. Accordingly, the present invention includes a system whereby two or more of these smaller components can be connected together, in some cases along with other auxiliary elements of the transportation system, to form an assembly which, in turn, can be handled and shipped as a standard freight container. Then, when the assembly has reached the construction site, the components can be disconnected from the transportation configuration and reconnected with one another and/or with additional components, of either the general or specialized type, in different configurations so as to form the structure being constructed.

Thus, each transport assembly of the overall system has gross dimensions generally corresponding to those of a standard freight container and includes at least two of the smaller specialized construction components. Each of these two specialized components has a first gross dimension with a maximum value generally equal to $C_1/x$, where $C_1$ is the width of a standard freight container, and x is greater than or equal to 1. Preferably, x is an integer, and even more preferably, x is equal to 1. Thus, the first dimension of the component is preferably equal to the width of a standard freight container.

Each of the specialized components further has a second gross dimension, perpendicular to the first dimension, whose maximum value is generally equal to $C_2/y$, where $C_2$ is the length of a standard freight container, and y is greater than 1. Thus, the second dimension is less than the length of a standard freight container. Preferably, y is greater than 2, whereby the second dimension of the component is less than or equal to half the length of a standard freight container.

Accordingly, several such components can be aligned lengthwise, with appropriate spacers therebetween if necessary, to form an assembly having the length of a standard freight container. As previously mentioned, the width of each such component is preferably equal to the width of a standard freight container. The components can be connected in such configuration, either directly, or via the aforementioned spacers, to form an assembly which can be handled and transported in the same manner as a standard freight container.

The third gross dimension, of the individual components as well as the overall assembly, can vary as desired, from one assembly to the next, and even within a given component, because the dimensions of standard freight containers which must be standardized include only the length and width, but not the depth.

It is highly desirable that the connection means which are used to connect the small specialized components to one another in their transport assemblies be the same connection means which are used to connect various construction components together to form the structure being constructed. More particularly, it is preferred that these connection means include the improved, retractable pin, lock assemblies described hereinabove. As is the case with the general, container sized, construction components, the retractability of the pins prevents them from interfering with handling of the transport assembly as a standard freight container.

For example, if the specialized components being combined to form a transport assembly are spud well components, or other components which are generally in the form of rectangular parallelepipeds, they may be provided with such lock assemblies on two opposite sides. It is then unnecessary to arrange these components in any special order or the like as they are being assembled for transport, because those male lock assemblies which ultimately lie on an outer peripheral side of the assembly as a whole, and are not being used to connect the components to one another in the assembly itself, can have their pins retracted.

Furthermore, the rigidity of the pins utilized in these preferred lock assemblies, and the fact that the assemblies are arranged in tandem pairs, provides a sufficiently rigid assembly for transportation and handling without the need for the assembly to be enclosed within a container. This is largely due to the aforementioned features of the tandem lock assemblies, with their rigid pins, which tend to prevent relative pivotal movement of components connected thereby, and this effect is further enhanced by the aforementioned shear bearing formations.

Accordingly, it is a principal object of the present invention to provide an improved construction transportation system for modular construction components.

Another object of the present invention is to provide such a system wherein modules are adapted to be connected to one another to form transport assemblies having gross dimensions generally corresponding to those of standard freight containers.

A further object of the present invention is to provide an improved construction component adapted to be connected to like components to form such a transport assembly.

Still other objects, features and advantages of the present invention will be made apparent by the following detailed description, the drawings and the claims.

BRIEF DESCRIPTION OF THE DRAWINGS

FIG. 6 is a view, similar to that of FIG. 4, showing a pair of tandem female lock assemblies.

FIG. 7 is a view of the tandem female lock assemblies similar to that of FIG. 5 and taken generally on the line 7—7 of FIG. 6.

FIG. 14 is a top plan view of a transport assembly according to the present invention comprising two rake components.

FIG. 15 is a side elevation view of the transport assembly of FIG. 14.

FIG. 16 is a top plan view of another embodiment of transport assembly comprising two rake components.

FIG. 17 is a side elevation view of the transport assembly of FIG. 16.

FIG. 20 is a side elevation view of a transport assembly comprising five spud well components.

FIG. 21 is a top plan view of the transport assembly of FIG. 20.

DETAILED DESCRIPTION OF THE PREFERRED EMBODIMENT

Figure 1:
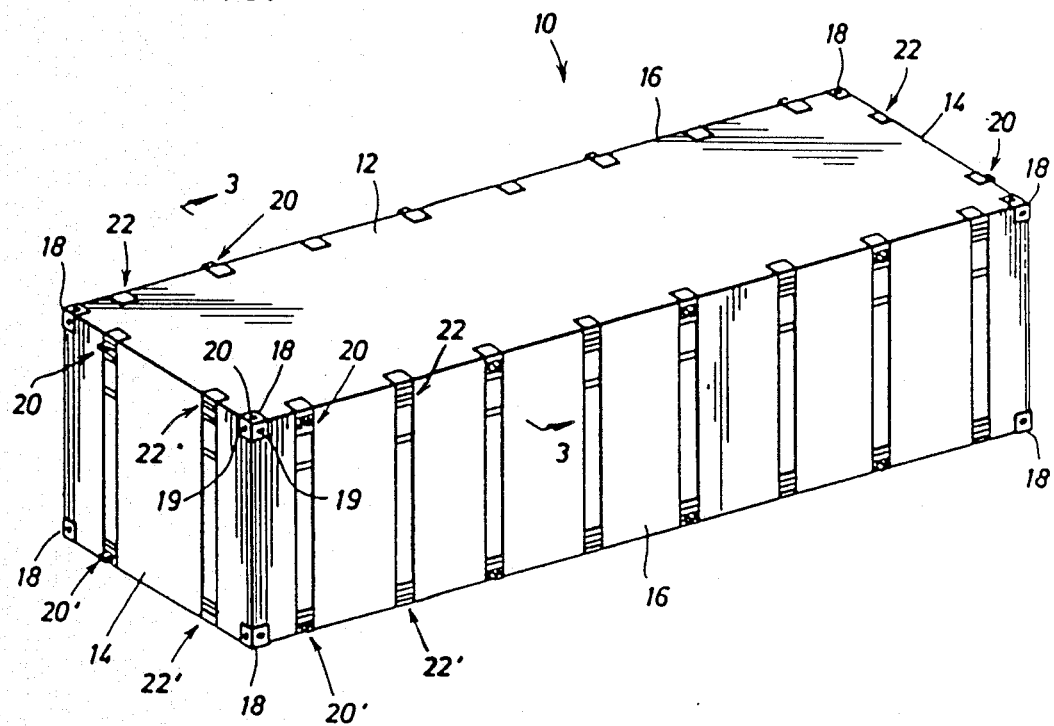
FIG. 1 is a perspective view of a construction component incorporating the present invention.

FIG. 1 represents a general construction component 10 according to the present invention incorporating improvements in the apparatus described and illustrated in prior U.S. Pat. Ser. No. 2,876,726, No. 3,057,315, and No. 3,805,721. Such improvements will be described in detail hereinafter. Otherwise, the component 10 and the lock assemblies carried thereby may be assumed to incorporate the various features disclosed in said prior U.S. patents. Accordingly, U.S. Pat. Ser. No. 2,876,726, No. 3,057,315, and No. 3,805,721 are hereby expressly incorporated herein by reference.

The construction component 10, as shown, is a buoyant type, so that it may be used in constructing floating bridges, barges, floating piers or docks, floating platforms, and the like. It will be appreciated, however, that the component 10, along with similar components, could likewise be used in the construction of various non-floating structures, such as land supported bridges, platforms, etc. Construction components specifically intended for the latter type usage may or may not be made buoyant, as desired.

More specifically, component 10 is in the form of a rectangular parallelepiped. Component 10 includes an internal force bearing framework, to be described hereinafter, which is generally encased within an outer covering including an upper wall 12, a lower wall 13, and four lateral walls. The lateral walls in turn are subdivided into end walls 14 and side walls 16.

In each corner of the component 10, there is mounted a standard container fitting 18. Such fittings are well known, and in particular, are of the same type which are used in the corners of standard freight containers. Each of the fittings 18 has three intersecting bores 19 into which lifting tools, lash lines and the like can be inserted for lifting and handling the component 10, lashing it in place in racks on a freighter, and otherwise handling the component 10 in the same manner as standard freight containers are handled.

The gross dimensions of component 10, measured between the outer surfaces of its various pairs of opposite walls, generally correspond to those of a standard freight container. For example, the gross dimensions of component 10 may correspond to those of any of the standard size containers listed in the leaflet "ISO Container Dimensions" filed herewith and hereby expressly incorporated by reference. However, it is contemplated that the present invention could be adapted to other container sizes which may become standard in the future.

More specifically, most of the facilities for handling standard freight containers today require standardization only as to the length and width of such containers, whereas vertical depth is not critical. For example, it can be appreciated that, in a storage rack for holding such containers on shipboard, vertical depth would not be critical, as the containers simply stack on top of one another. However, length and width would have to be standardized in order for the containers to fit properly in the racks. Thus, for such standardized systems, a component such as the component 10 would be considered to have gross dimensions generally corresponding to those of a standard freight container if its length and width are approximately equal to the length and width of a standard freight container. However, if for some particular installation, or in some future freight handling system, there is a need to standardize vertical depth, the present invention contemplates that the depth of the components according to the present invention could likewise be chosen to fit such standards.

When it is said that the gross dimensions of component 10 "generally" correspond to those of a standard freight container, it is meant that any projections formed by the container fittings 18 or the various parts of the lock assemblies to be described hereinafter, when those lock assemblies are placed in suitable positions for transport, do not project beyond the outer surfaces of the walls of component 10 by distances such as to interfere with the shipping and handling of component 10 in generally the same manner as a standard freight container.

A plurality of upper and lower male lock assemblies 20 and 20', respectively, and upper and lower female lock assemblies 22 and 22', respectively, are carried adjacent the upper and lower edges of the lateral walls, i.e. end walls 14 and side walls 16. The lock assemblies are arranged in tandem pairs, the assemblies of each pair being vertically spaced so that they are disposed respectively adjacent the upper and lower edges of the particular lateral wall on which they are located Terms such as "vertical," "horizontal," "top," "upper," and "lower" are used herein for convenience; they refer to the apparatus as shown and as normally used, and should not be construed as further limiting the scope. The assemblies of each pair are of the same gender, and the male and female assemblies are alternated along the length of each lateral wall, and are of an even number. Thus, on each end wall 14 there are two pairs of assemblies, one pair of male assemblies 20 and 20' and one pair of female assemblies 22 and 22'.

Furthermore, the male assemblies 20 and 20' on one of the end walls 14 are disposed across from and aligned with the female assemblies 22 and 22' of the other of the end walls 14. Thus, as may be seen in FIG. 2, one end of a component 10 can be aligned with either end of another similar component 10, and the male assemblies of each of said ends will automatically be aligned with the female assemblies of the other of said ends so that the two can be connected. Similarly, there are eight pair of lock assemblies, alternately male and female, arranged along the length of each of the side walls 16, and each male assembly on one side of the construction component is located across from a female assembly on the other side. Thus, a given side of a component 10 can be connected to either side of another similar component 10.

Figure 2:
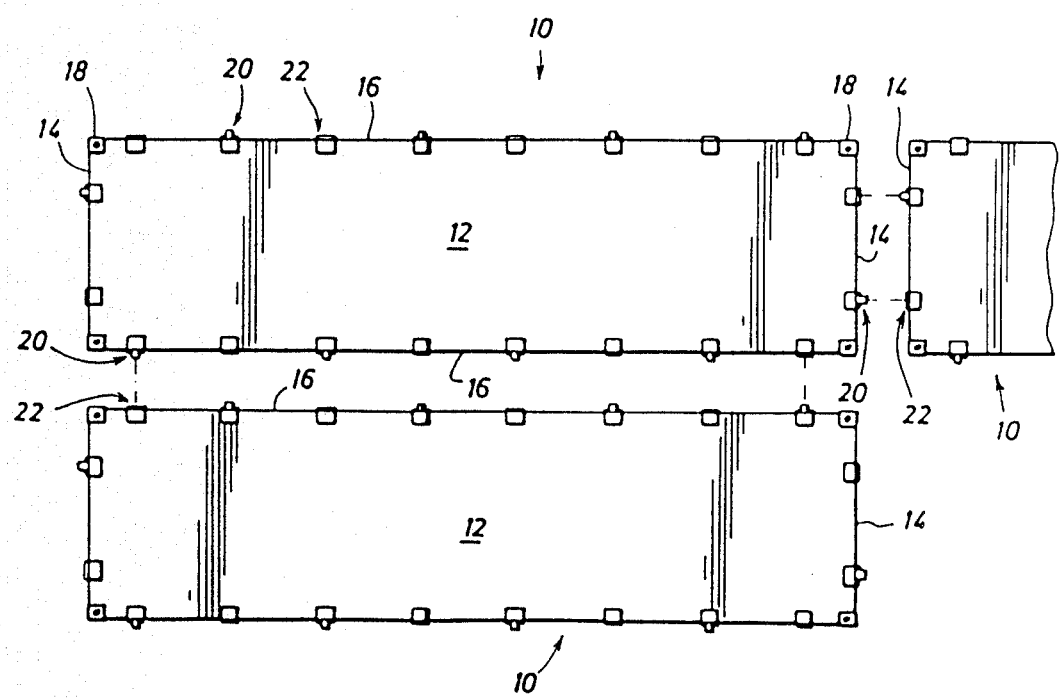
FIG. 2 is a top plan view of several construction components, of the type illustrated in FIG. 1, positioned for prospective connection in one of several possible configurations.

This differs from the arrangements disclosed in said prior U.S. Pat. Ser. No. 2,876,726, No. 3,057,315, and No. 3,805,721, wherein all of the assemblies on any given side of the device were of the same gender, and consequently, a given end or side of one component could only be connected to one end or one side of a similar component. Of course, it will be appreciated that FIG. 2 illustrates only one, and that a relatively simple one, of the many configurations in which such components can be connected. It will be noted, in particular, that among the variations are those in which components are connected end-to-side and those in which they are connected side-to-side, but in an offset or staggered manner.

Figure 3:
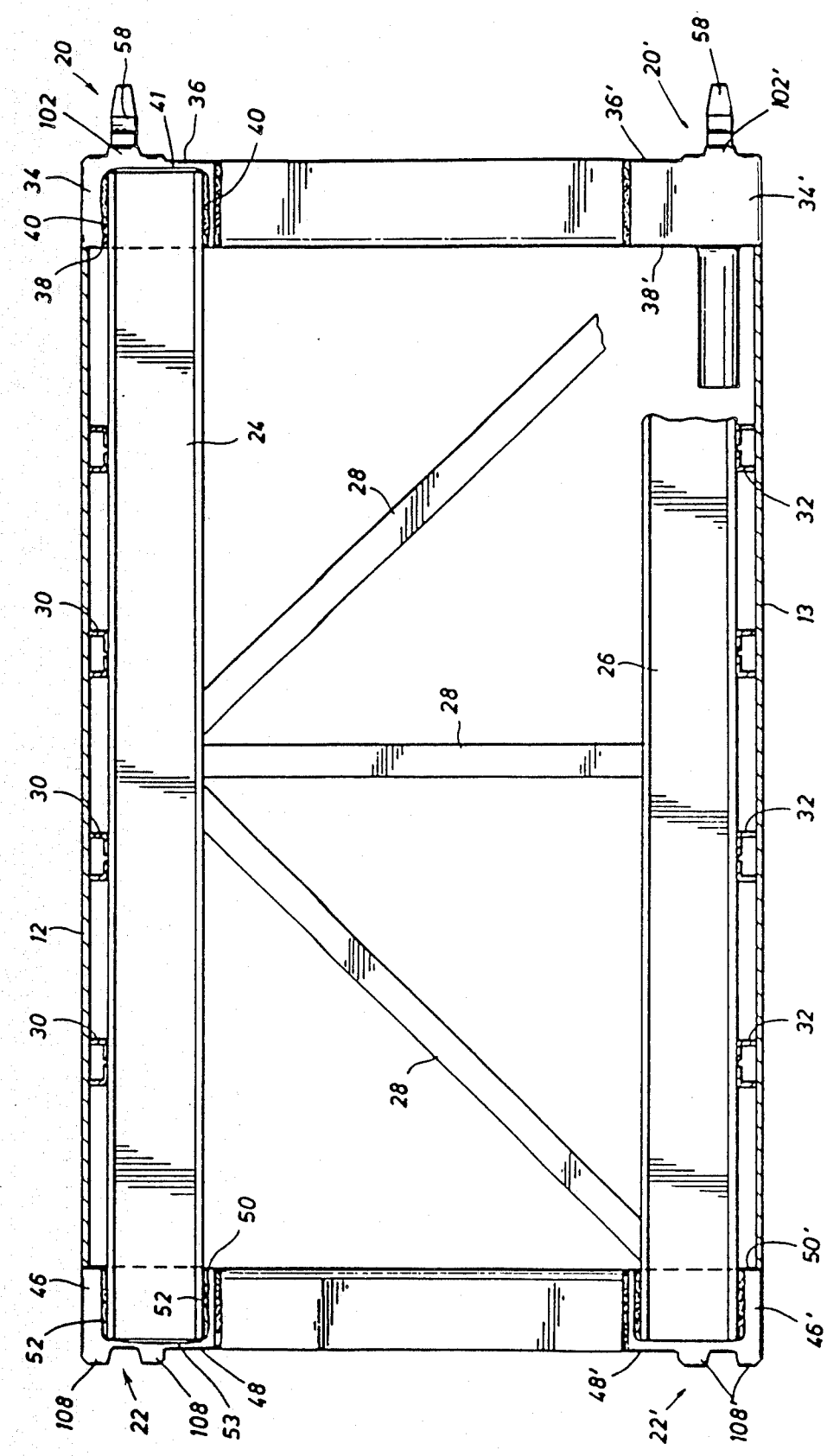
FIG. 3 is a transverse view through the construction component of FIG. 1 taken along the line 3—3 of FIG. 1.

As previously mentioned, the construction component 10 includes an internal structural framework which, as more fully described in the aforementioned prior U.S. patents, may include a plurality of interconnected trusses. An exemplary truss, and more specifically a transverse truss extending from side-to-side within component 10, is shown in FIG. 3. As mentioned, each tandem pair of male assemblies on one side of the construction component is located across from a tandem pair of female assemblies on the other side of the component.

As shown in FIG. 3, such complementary pairs of male and female lock assemblies are mounted at opposite ends of a given transverse truss. The truss shown in FIG. 3 includes parallel upper and lower cords 24 and 26, interconnected by struts 28. As fully explained in prior U.S. Pat. Ser. No. 3,057,315, struts 28 are arranged so as to abut cords 24 and 26 at spaced apart locations, so as to enhance the flexibility of the truss. Similarly, rails 30, which space upper wall 12 from the upper extremity of cord 24 and similar cords in other trusses throughout the construction component, abut cord 24 at positions spaced longitudinally from those at which the trusses 28 abut cord 24. Likewise, rails 32 which are disposed between the bottom of lower cord 26 and the bottom wall 13 of the construction component are longitudinally spaced from the locations of abutment of struts 28 with cord 26.

Figures 4, 5:
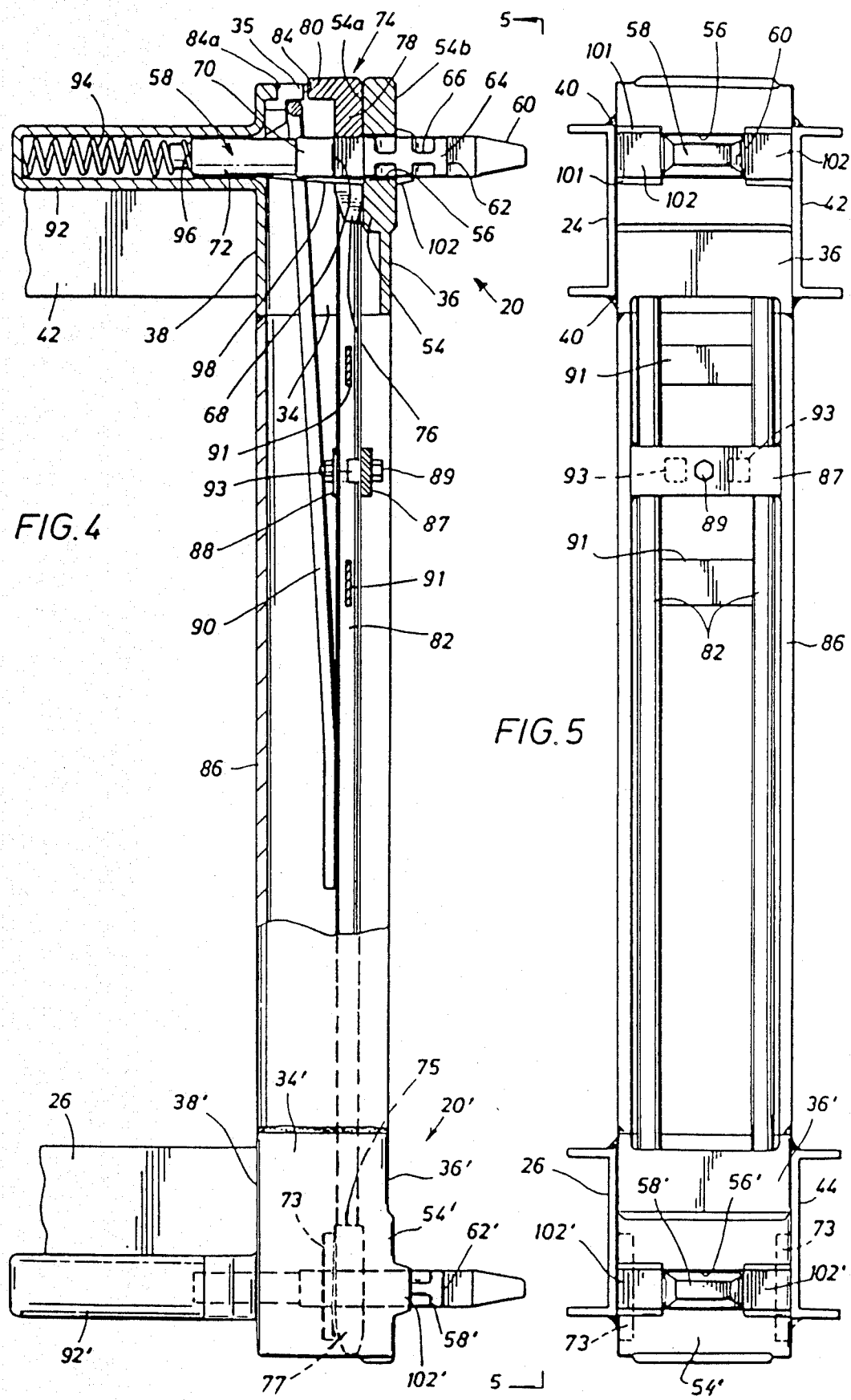
FIG. 4 is a side view, partly in cross section and partly in elevation, of a pair of tandem male lock assemblies.
FIG. 5 is a front view of the tandem male lock assemblies, taken generally on the line 5—5 of FIG. 4.

Referring now jointly to FIGS. 3, 4 and 5, each of the male lock assemblies 20 and 20' of the tandem pair shown includes a body in the form of a housing 34 or 34', respectively. Housing 34 will be described in greater detail hereinafter. Housings 34 and 34' are identical, but reversed in orientation so that they are mirror images across a horizontal plane. At this point, it is further noted, that any part of lower male lock assembly 20' which is identical to a part of upper male lock assembly 20 will be designated by the same reference numeral with the character "'" appended thereto. To the extent that the upper and lower male lock assemblies are identical, the lower assembly will not be described in great detail. The same scheme will be utilized in describing upper and lower female lock assemblies 22 and 22'.

Housing 34 has a front wall 36 located near the outer end of the truss in position for general alignment with the respective side wall 16, and a rear wall 38 spaced therefrom inwardly with respect to the truss. Cord 24 is channel-shaped and is welded to one side of the housing 34 of the upper male lock assembly 20 of the tandem pair. Cord 24 is oriented so that its channel faces laterally outwardly with respect to the connected male housing 34. The weld lines 40 extend along housing 34 for a substantial distance in the front-rear directional mode. In addition, there is a weld 41 across the end of cord 24.

As best seen in FIGS. 4 and 5, another channel-shaped cord 42 is welded to the opposite side of the housing 34 from cord 24. Cord 42 forms a part of another truss, which is a mirror image of the truss shown in FIG. 3, and which further includes lower cord 44 and interconnecting struts (not shown). Thus, the housing 34 of the upper male lock assembly 20 is sandwiched between the upper cords 24 and 42 of two adjacent trusses. Similarly, housing 34' of lower male lock assembly 20' is welded between the ends of the lower cords 26 and 44 of the two adjacent trusses.

Referring now to FIGS. 3, 6 and 7, there is shown a pair of tandem female lock assemblies 22 and 22', each of which includes a female body in the form of a female housing 46 or 46', respectively. (Hereinafter, parts of the male and female lock assemblies which are more or less similar or analogous will be designated "male" or "female" to distinguish between the parts of the two genders of assemblies, and this is not intended to imply that these parts are necessarily of a projecting or receiving type configuration.)

Female housing 46 has a front wall 48 and a rear wall 50 spaced therefrom. Thus, when the upper female housing 46 is welded between the ends of cords 24 and 42 opposite the ends which mount the upper male assembly 20, the weld lines 52 may extend a substantial distance in the front-rear directional mode. There is also a weld 53 across the end of the cord. The female housing 46' of the lower female lock assembly is likewise welded between the ends of cords 26 and 44 opposite those which mount the lower male lock assembly 20'.

Referring now to FIGS. 4 and 5, the male lock assemblies and 20' will be described in greater detail, and it will be understood that all other tandem pairs of male lock assemblies on the component 10, are identical.

The front wall 36 of male housing 34 has a thickened portion 54 which serves as the male socket means and has rear and front walls 54a and 54b, respectively. Male socket means defines a rectangular male socket opening 56 extending therethrough in the front-rear directional mode. (As used herein, the "front-rear directional mode" will generally refer to a position or direction of orientation parallel to front-to-rear and rear-to-front directions.) As shown in FIG. 5, the transverse horizontal dimension of male socket opening 56 is substantially greater than its transverse vertical dimension.

Figure 10:
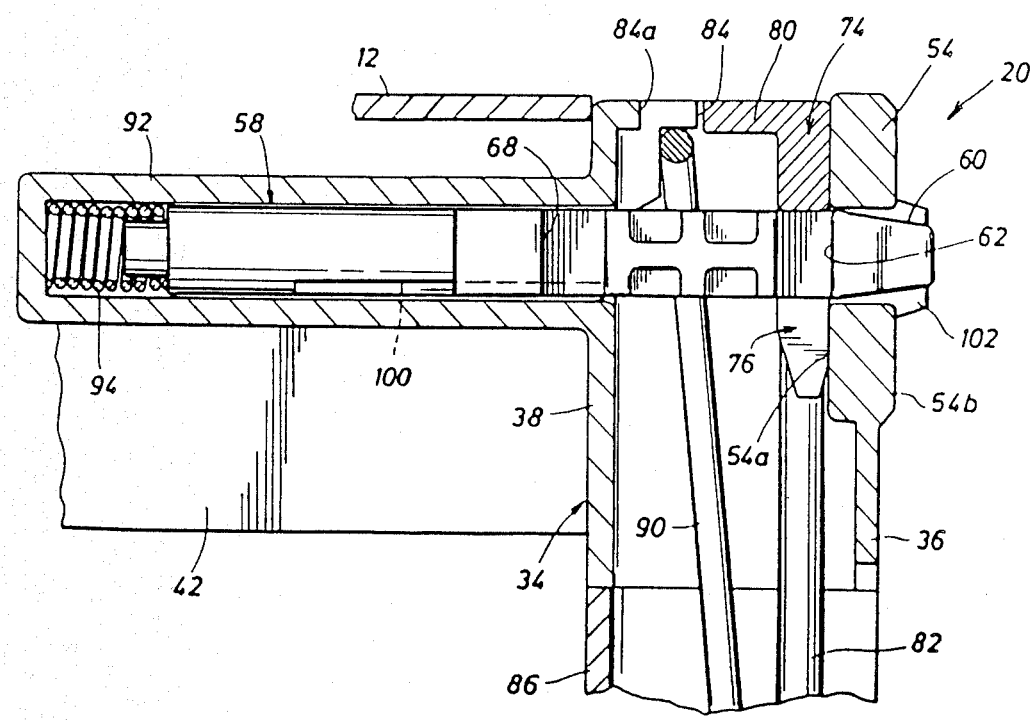
FIG. 10 is an enlarged detailed side view, in cross section, of one of the male lock assemblies with the pin member thereof locked in its retracted position.

The male lock assembly 20 further includes a monolithic cast metallic pin member 58 which is slidably received in opening 56 for reciprocation, in the front-rear directional mode, between an advanced position, as shown in FIG. 4, and a retracted position, as shown in FIG. 10. The portion of pin member 58 which is received in opening 56 is generally of a complementary rectangular cross-sectional configuration, of greater horizontal dimension than vertical dimension.

Comparing FIGS. 4, 5, 9 and 10, the outermost or head end of pin member 58 is tapered, as shown at 60, to a somewhat smaller rectangular cross section. Head end 60 has a notch 61 in its upper surface. At the juncture of head end 60 and the larger rectangular portion 64 of pin member 58, there is a first lock engagement region or necked down area including a pair of grooves 62 extending vertically along opposite sides of pin member 58 and opening laterally outwardly. Rearward of grooves 62 is the relatively large rectangular portion 64 of pin member 58, forward or rear portions of which are disposed in opening 56, depending upon whether pin member 58 is in its retracted or advanced position.

Portion 64 of pin member 58 has recesses 66 in its upper and lower surfaces, for a purpose to be described hereinafter. Recesses 66 are not sufficiently large to unduly detract from the load bearing capabilities of portion 64 of pin member 58.

At the rear extremity of large rectangular portion 64 of pin member 58, there is a second lock engagement region or necked down area including vertical grooves 68 substantially identical to grooves 62. Rearward of grooves 68 is a small tapered section 70, which in turn adjoins the cylindrical tail end 72 of the pin member 58. It should be noted that the diameter of tail end 72 does not exceed the vertical dimension of rectangular portion 64 of pin member 58.

Male lock assembly 20 further comprises lock means in the form of a plate-like lock member 74. The male lock member 74 is substantially identical to the female lock member 116 of female lock assembly 22, to be described more fully hereinbelow. Thus, comparison of FIGS. 4 and 5, which show male lock member 74 in its lower or locking position, with FIGS. 6 and 7, which show the identical female lock member 116 in its upper or release position, may facilitate understanding of both male and female lock members.

More particularly, lock member 74 is generally in the form of an inverted U, having downwardly extending tines or rails 76 sized to slidably fit in respective locking grooves 68, or alternatively, in respective locking grooves 62. Rails 76 are joined at their upper ends by a bridge section 78. A tab 80 extends rearwardly from the upper end of bridge section 78.

Lock member 74 is disposed just rearwardly of male socket means 54 in sliding abutment with the rear face 54a thereof. An opening 84 in the upper wall 35 of male housing 34 allows lock member 74 to be raised from the locking position shown in FIG. 4, wherein rails 76 are disposed in one or the other of the two pair of locking grooves 62 or 68, to a raised release position, wherein the locking member 74 clears the pin member 58. For this purpose, a suitable tool such as a crowbar, can be inserted in a notch 84a in opening 84 and engaged under tab 80.

The lower male lock assembly 20' of the tandem pair has a male housing 34' which is a mirror image of housing 34 across a horizontal plane. Assembly 20' further includes a pin member 58' which is identical to the pin member 58 of the upper male lock assembly 20 and oriented in the same manner. Because the pin members 58 and 58' are identical, and because their locking grooves, e.g. 62 and 68, extend completely therethrough in the vertical direction, it is possible for the lock member 75 of lower male lock assembly 20' to be oriented in the same manner as the lock member 74 of upper male lock assembly 20, i.e. with its bridge section uppermost and its rails or tines extending downwardly therefrom. Lock member 75 is identical to lock member 74, except that it lacks the tab 80 and its rails 77 are longer.

The two lock members 74 and 74' are connected for joint reciprocation between their locking positions and release positions by lock extension means in the form of rods 82 welded to the laterally outer sides of the two male lock members. The lower end of the housing 34 of the upper male lock assembly, and the identical upper end of the housing 34' of the lower male lock assembly are open to permit the necessary movements of rods 82. These open ends of housings 34 and 34' are further rigidly interconnected by body extension means in the form of a channel member 86, as by welding. Guides 73 are welded to housing 34' for cooperation with the rear surface of lower male lock member 75.

A male lock retainer, which is substantially identical to the device 61, 62, 63, 64 shown in prior U.S. Pat. Ser. No. 3,805,721, is provided. Briefly, the device includes a base plate 87 which is welded between the sides of channel 86 in a position to slidably engage the front surfaces of rod 82. A nut and bolt assembly 89 connects plate 87 to a spring 88 which is thereby clamped against the rear surfaces of rods 82 to frictionally engage the rods, and thereby, indirectly frictionally engage the lock members 74 and 75. The force with which the device 87, 88, 89 frictionally engages rods 82 is generally sufficient to prevent separation of the lock members 74 and 75 from their respective lock assemblies. In addition, positive stop bars 91 are welded between rods 82, for abutment with blocks 93 carried on plate 87, to positively limit vertical movement and prevent such separation. In addition, the friction device 87, 88, 89 urges the lock members 74 and 75 forwardly against their respective sockets 54 and 54'. Finally, friction device 87, 88, 89 will temporarily maintain the tandem lock member 74 and 75 in any position in which they are placed, and in particular, if they are raised, will temporarily maintain them in a raised position against the force of gravity. Nevertheless, the force with which the friction device engages rods 82 is not so great as to interfere with selective manual raising or lowering of the lock members, with simple tools such as crowbars and hammers, when desired.

To more securely hold the male lock members 74 and 75 in their lowered or locking positions, an inverted-U-shaped latch spring 90 is mounted on rods 82. Spring 90 is substantially identical in structure and function to that of prior U.S. Pat. Ser. No. 3,805,721, and thus, will not be described in great detail herein. Briefly, spring 90 is biased rearwardly so that, when the locking members 74 and 75 are in their locking positions, as shown in FIG. 4, the upper end of spring 90 is disposed beneath the upper wall 35 of housing 34 just adjacent opening 84. When it is desired to raise the lock members 74 and 75, a tool can be inserted in notch 84a to pry spring 90 forward so that the lock members can be raised. Then, whenever the lock members are again lowered to their locking positions, spring 90 will automatically snap back into a latching position under the upper wall of housing 34.

The rear wall 38 of housing 34 has a pocket 92 extending rearwardly therefrom for sliding receipt of the tail end 72 of pin member 58. A helical compression spring 94 is interposed between the bottom of pocket 92 and a shoulder 96 on the tail end 72 of pin member 58 to bias pin member 58 forward. To retain pin member 58 from being ejected through socket opening 56 or falling out from that opening when the lock member 74 is raised to its release position, a pin retainer in the form of spring 98 is carried on the underside of pin member 58. Spring 98 extends generally longitudinally along pin member 58. Its rear end is anchored on pin member 58, while its forward end is free and biased outwardly away from pin member 58. However, spring 98 can be biased inwardly so that it fits into a groove 100 (see FIG. 9) in the underside of pin member 58.

Thus, in assembling the male lock assembly 20, spring 94 can be inserted through socket opening 56 and into pocket 92. Pin member 58 is then inserted through socket opening 56, such insertion being permitted by the fact that the vertical dimension of pin member 58 nowhere exceed that which might pass through socket opening 56. As the pin member 58 is being inserted into housing 34 through socket opening 56, spring 98 is cammed inwardly by the lower surface of opening 56 into groove 100. Once groove 100 passes completely through socket opening 56, the forward end of spring 98 will spring outwardly and abut the rear face 54a of socket means 54, thereby preventing pin member 58 from falling back out of opening 56. Abutment of spring 98 with rear face 54a of socket means 54 also limits forward movement of pin member 58 under influence of spring 94 to a proper advanced position wherein grooves 68 are positioned for engagement by rails 76 of locking member 74. If it is necessary to disassemble the lock assembly, a suitable tool can be inserted through opening 84 to force spring 98 upwardly into groove 100 until pin member 58 has been advanced sufficiently for spring 98 to be held in its groove 100 by the lower surface of socket opening 56.

The rear wall 38' of housing 34' of lower male lock assembly 20' has a pocket 92' identical to pocket 92. As previously mentioned, the pin members 58 and 58' of the upper and lower male lock assemblies are identical, and the pin member 58' of the lower male lock assembly 20' has associated therewith springs identical, both in form and in interrelation with other parts of the lock assembly, to springs 94 and 98. Thus, these springs in the lower male lock assembly 20' will not be shown or further described in detail.

The front wall 36 of housing 34 has a pair of shear bearing lugs 102 formed thereon. Lugs 102 are disposed on opposite sides of socket opening 56. Lugs 102 project forwardly from the remainder of front face 54b of socket means 54, but by a distance sufficiently small that they will not interfere with the handling of the construction component 10 on which the lock assembly is carried in the manner of a standard freight container. The upper and lower surfaces 101 of each lug 102 are planar surfaces extending generally horizontally but slightly vertically inclined toward each other for a purpose to be described more fully hereinbelow. Housing 34' of lower male lock assembly 20' has identical lugs 102' thereon.

Referring now to FIGS. 6 and 7, upper female lock assembly 22 will be described in greater detail. The housing 46 of upper female lock assembly 22 is similar to the housing 34 of upper male lock assembly 20 in many respects. Its front wall 48 includes a female socket means 104 having rear face 104a and front face 104b. A female socket opening 106, substantially identical in size and shape to opening 56 of male lock assembly 20, extends through socket means 104 in the front-rear directional mode.

Front wall 48 of housing 46 differs from front wall 36 of housing 34 in that, rather than the lugs 102, wall 48 has a pair of lugs 108 formed thereon and disposed immediately above and below socket opening 106. For convenience, lugs 108 extend completely laterally across the socket means 104. However, since the purpose of lugs 108 is to engage lugs 102 when the male and female lock assemblies are mated, each lug 108 could be replaced by a pair of lugs spaced apart by a distance corresponding to socket opening 106. Lugs 108 define therebetween a space 110 for receipt of lugs 102. The planar surfaces of lugs 108 which define space 110 are slightly vertically inclined to correspond to the taper 101 of lugs 102.

The rear wall 50 of housing 46 is similar to the rear wall 38 of housing 34 of upper male lock assembly 20 except that it lacks the integral pocket 92. The upper wall of housing 46 is similar to that of the male housing 34, and in particular, includes an opening 112 identical to opening 84 and including a notch 112a identical to notch 84a. The bottom of housing 46 is identical to that of housing 34, and in particular, is open and is connected by a channel member 114 to the upper end of housing 46' of the lower female lock assembly 22'.

A female lock member 116, identical to male lock member 74, is mounted for reciprocation with respect to socket means 104 and its socket opening 106 between a raised release position as shown and a locking position in which the rails 118 of locking member 116 are disposed generally on opposite sides of opening 106 and overlapping therewith. In addition to the rails or tines 118, locking member 116 includes a bridge section 120 connecting the upper ends of rails 118, and a tab 122 extending rearwardly therefrom. The structure of member 116 is identical to that of male lock member 74, and the relationships between the member 116 in its locking and release positions, with respect to opening 106, are precisely the same as the analogous positions of members 74 with respect to opening 56.

Locking member 116 is likewise connected to a similar locking member 117 of the lower female lock assembly 22' by rods 124, by welding, for joint reciprocation between locking and release positions. The assembly 116, 124, 117 is identical to the assembly 74, 82, 75 of the tandem male lock assemblies 20 and 20'. Likewise, a frictional retaining device 125, 126, 127 identical to device 87, 88, 89 is provided for assembly 116, 124, 117, as are stops 129, 131 and a latch spring 128, identical to stops 91, 93 and spring 90, both in structure and function.

As with the tandem male lock assemblies, the tandem female lock assemblies shown in FIGS. 6 and 7 differ in that their housings 46 and 46' are reversed or arranged as mirror images of each other, while their respective locking members 116 and 117 are oriented in the same direction, i.e. with their tines extending downwardly. Likewise, locking member 117 of the lower female lock assembly has longer tines 119 but lacks a tab analogous to tab 122 of member 116. Otherwise, the female lock assemblies are identical, and in particular, it is noted that shear bearing lugs 108', identical to lugs 108, are formed on front wall 46', and guides 109 are provided for lower female lock member 117.

The operation of the male and female lock assemblies is as follows. For transport to the construction site, the pin members of the male lock assemblies would be placed in their retracted positions. FIG. 10 shows the pin member 58 of upper lock assembly 20 in its retracted position, and the retracted position of the pin member 58' of the lower male lock assembly would be analogous. As shown in FIG. 10, pin member 58 has been forced rearwardly, compressing spring 94, until the grooves 62 of its first lock engagement region are disposed behind the rear face 54a of socket 54 where they are engaged by respective rails 76 of locking member 74, which has been lowered to its locking position.

As will be explained more fully below in connection with the advanced position of the pin 58, rails 76 are sized to project laterally outwardly from grooves 62 beyond the sides of opening 56 so that they may abut the rear face 54a of socket 54. Thus, the rear-to-front force exerted on pin member 58 by compressed spring 94, or any other rear-to-front force which might be exerted on pin member 58, is transmitted through locking member 74 to socket 54, whereby pin member 58 is prevented from advancing from the position shown in FIG. 10. Although further retraction of pin 58 rearwardly from the position of FIG. 10 is not a particular problem, it might be noted that such movement will be limited by abutment of tab 80 of lock member 74 with the edge of opening 84 in housing 34 and abutment of lock member 75 with guides 73.

The locking member 74 is latched into its lowered or locking position, as shown, by virtue of the fact that spring 90 underlies the top wall 35 of housing 34 adjacent opening 84. It should be noted that, when the lock member 74 is in its locking position, it lies generally flush with the upper extremity of housing 34, which in turn is generally flush with the top wall 12 of the construction component 10 (shown in FIG. 10 but broken away in other FIGS. for clarity). The head end of pin member 58 projects forwardly from the front face 54b of socket 54 only by a very small distance, generally comparable to that by which the lugs 102 project. As previously mentioned, this distance is not great enough to interfere with transport and other handling of the construction component 10 in the manner of a standard freight container. Thus, with the apparatus in the position of FIG. 10, it will be said that all parts of the male lock assembly lie generally within the gross dimensions of the construction component 10. The pin member 58' will be held in a similar retracted position by its respective locking member 75, as will all other pin members of all male lock assemblies on the construction component.

When the component 10, and similar components to connected thereto, have reached the construction site, the pin members of those male lock assemblies which will be used to make up the connections between the construction components will be placed in their advanced positions, as shown in FIG. 4, and the locking members of the female lock assemblies to be connected therewith will be raised to their release positions as shown in FIGS. 6 and 7.

More specifically, with respect to the male lock assemblies, and beginning from the position of FIG. 10, a crowbar or other suitable tool is inserted into notch 84a in opening 84 in the top wall 35 of housing 34 of the upper male lock assembly 20. In a manner more fully explained in the aforementioned prior U.S. patents, the tool is used to force the upper end of spring 90 forward, until it clears the underside of the top housing wall and is forced under tab 80. By continued movement of the tool, tab 80 can be pried upwardly, thereby raising locking member 74 and the connected locking member 75 of the lower male lock assembly 20'. Continued upward movement may be effected, either with the same or another tool, or by hand, once the upward movement has been started in the aforementioned manner.

When the locking members 74 and 75 have been raised a sufficient distance to clear their respective pin members 58 and 58', i.e. to their release positions (which are analogous to those shown in FIGS. 6 and 7 for the female lock assemblies) pin member 58 will be urged outwardly by spring 94, and pin member 58' will likewise be urged outwardly by a similar compression spring (not shown) in pocket 92'. If, for any reason, e.g. breakage of such compression springs, the pins 58 and 58' do not advance from their retracted positions, a simple tool can be engaged in notch 61, or in any of the recesses 66, depending on the current position of the pin member, to force the pin member outwardly or forwardly to its advanced position. Since housing 34' is identical to housing 34, and in particular, has an opening (not shown) in its lower wall identical to opening 84 in the upper wall of housing 34, a similar technique may be used to force pin 58' outwardly or forwardly.

As the portion of pin 58 which, in its retracted position, is disposed in pocket 92, moves forwardly, spring 98 will automatically emerge from its groove 100 in the underside of pin member 58. Spring will engage rear face 54a of socket 54 when the pin member 58 is in its advanced position, i.e. with grooves 62 located well beyond front face 54b of socket 54 and with grooves 68 located just behind rear face 54a, under influence of spring 94. Although spring 98 would not be sufficient to take high tensile loading, it will stop the movement of pin member 58 in the forward direction under the relatively low force exerted by spring 94, and temporarily hold the pin member 58 in that position until lock member 74 can be lowered to its locking position, as shown in FIG. 4. Pin member 58' has an identical spring (not shown) which similarly stops the forward movement of pin member 58' at its advanced position.

When locking member 74 is lowered, as by striking it with a hammer, the connected locking member 75 will automatically be lowered therewith. Rails 76 of locking member, 74 will enter grooves 68, and rails 77 of locking member 75 will enter analogous grooves in lower pin member 58'. Since locking member 74 is sandwiched between rear face 54a of socket 54 and the edge of upper housing wall 35 adjacent opening 84, and lock member 75 is sandwiched between socket 54' and guides 73, this position locks the pin members in their advanced positions. The locking rails 76 or 77 of each pair have their inner sides flared outwardly and downwardly, as explained in the aforementioned prior U.S. patents (see also 118a and 119a in FIG. 7), to tighten the locking engagement gradually. Also, as shown in FIG. 4, for example, the lower end of each rail 76 has its front and rear surfaces tapered inwardly and downwardly to guide the rails into the locking grooves. During the aforementioned lowering of the assembly 74, 82, 75, spring 90 will snap into place beneath the upper wall of housing 34 adjacent opening 84.

The locking members 116 and 117 of the tandem female lock assemblies 22 and 22' will be raised to their release positions, as shown in FIGS. 6 and 7, in the same manner as was done with the male lock assemblies. Then, with the male lock assemblies in the positions shown in FIGS. 4 and 5, and the female lock assemblies in the positions shown in FIGS. 6 and 7, the construction components on which these assemblies are carried are drawn toward each other, as by ropes or the like, so that pin members 58 and 58' enter socket openings 106 and 106', respectively. The tapered areas 60 on the head end of pin member 58 help to gradually guide the pin member into the female socket opening 106. Because the lugs 108 extend completely across the front face of female housing 46, and in particular, across the upper and lower borders of socket opening 106, tapered areas 110 likewise help to gradually guide pin member 58 into socket opening 106. The same type action occurs in the lower lock assemblies 20' and 22'.

When the assemblies have been thus mated, the grooves 62 of the first lock engagement region of pin 58 will be disposed just behind rear face 104a of socket 104 of the mating female lock assembly. Analogous grooves of pin member 58' will be in a like position with respect to lower female lock assembly 22'. By striking the locking member 116 of the upper female lock assembly 22, both locking members 116 and 117 are lowered to their locking positions, to place the apparatus in the condition illustrated in FIGS. 8 and 9.

It is specifically noted that, as the assembly 116, 124, 117 is being lowered, long rails 119 of the lower female lock member 117 will begin to engage their respective pin member 58' before rails 118 of upper female lock member 116 engage pin 58. Because of the downward and outward flaring of the laterally inner edges 119a of rails 119 (see FIG. 7), and the downward and inward tapering of the front and rear surfaces of the rails 119 at their lower ends (see 119b in FIG. 6), the lower lock assemblies 20' and 22' will be gradually cammed or wedged into firm mating engagement by the lowering of lock member 117. This will overcome any tendency of the lower edges of the lateral walls on which the lock assemblies are carried to splay (as the weight of the workers standing near those lateral walls on the upper deck tips or rocks the respective construction components). Thereafter, the upper lock member 116 may readily be fully lowered and engaged with its respective pin member. It is noted, in particular, that if the upper female lock member 116 were permitted to engage its respective pin member too soon, it could provide a pivot point which would increase the tendency of the lower edges of the lateral walls of the two construction components to splay thereby making it difficult to properly mate and lock the lower assemblies.

Figure 8:
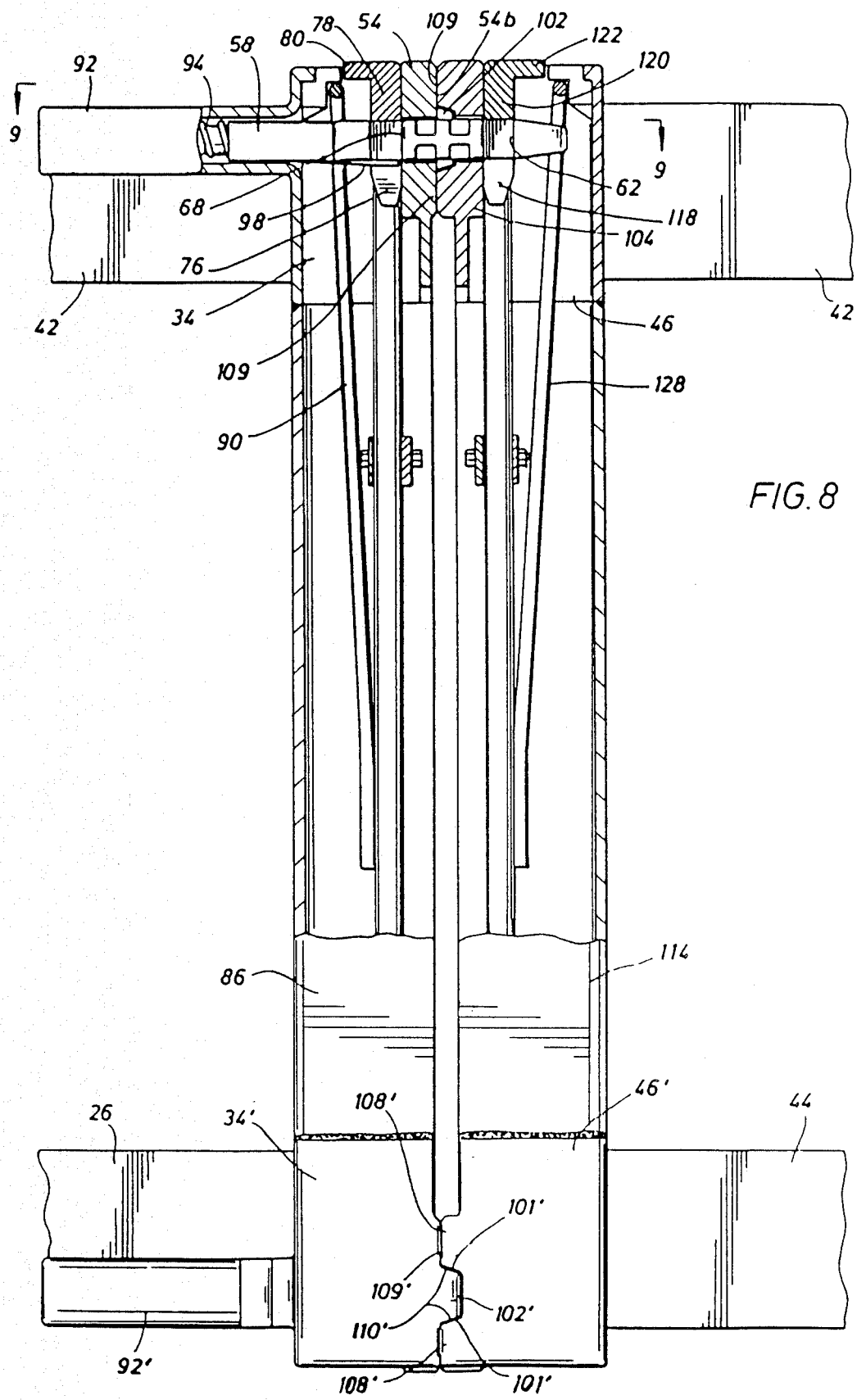
FIG. 8 is a side view, partly in cross section and partly in elevation, showing the tandem lock assemblies of FIGS. 4 and 6 in mated and locked condition.
Figure 9:
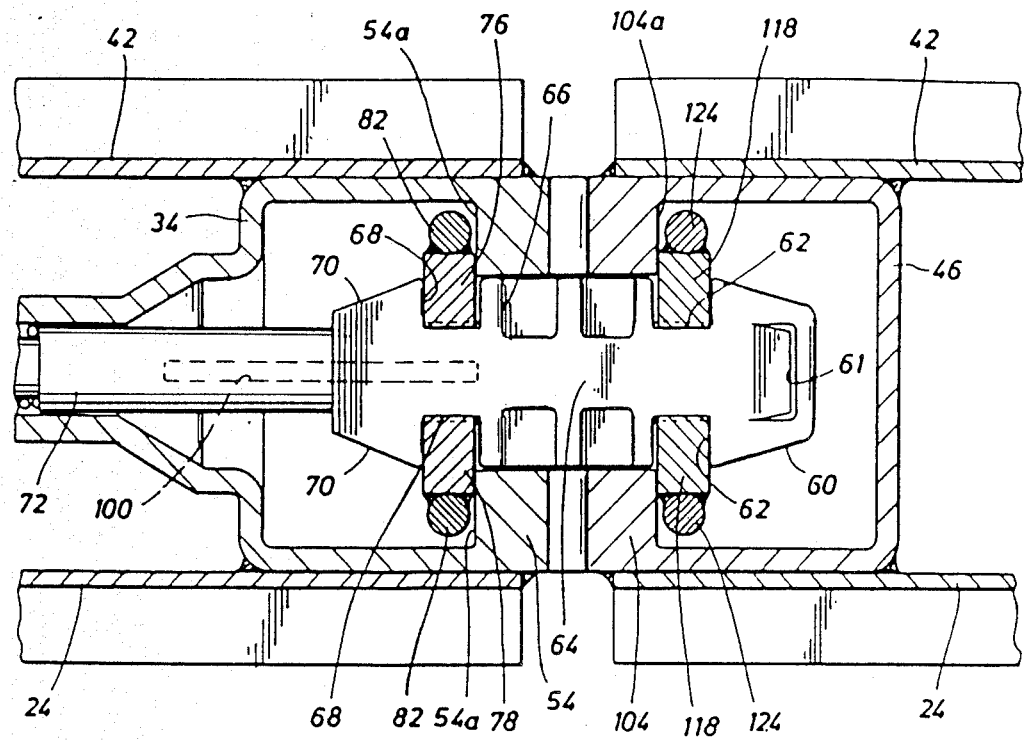
FIG. 9 is an enlarged detailed view, taken along the line 9—9 of FIG. 8.

With the apparatus in the condition illustrated in FIGS. 8 and 9, because rails 118 of upper female locking member 116 are disposed in grooves 62 of pin member 58, but extend laterally outwardly therefrom to abut rear face 104a of female socket 104, any front-to-rear force exerted on pin member 58 will be transmitted through locking member 118 to socket 104, whereby pin member 58 is locked into female lock assembly 22.

If a rear-to-front tensile force is exerted on pin member 58, e.g. if the construction component on which the female lock assembly 22 is carried tends to pull away from the construction component on which the male assembly 20 is carried, such force will be transmitted from the rear face 104a of socket 104 through locking member 118 to pin member 58, and from pin member 58 through male locking member 74, to male socket 54.

When the male and female lock assemblies have been mated and locked together, the shear bearing lugs 102 and 108 of the male and female lock assemblies, respectively, are meshed. Because the shear bearing formations 102 and 108 project and receive in a generally front-rear directional mode with respect to pin member 58, they are capable of transmitting shear forces transverse to pin member 58 independently of that pin member. In particular, the upwardly and downwardly facing surfaces of lugs 102, and the opposed surfaces of lugs 108, while tapered or vertically inclined to help guide the lock assemblies into proper engagement and to ensure, through a wedging action, contact between the male and female shear bearing formations, face generally vertically, and therefore, are capable of transmitting vertical shear loads between the housing 34 and 46 independently of pin member 58.

This arrangement is chosen, especially for components to be used in constructing floating structures such as barges, because the vertical shear forces tend to be greater than the transverse horizontal shear forces. However, it will be appreciated that the principles of the present invention can likewise be applied to provide shear bearing formations which would transmit horizontal shear forces independently of the pin member. In general, it is desirable that the shear bearing formations be arranged so as to transmit shear loads transverse to the pin member in a direction generally parallel to the path of reciprocation of the locking means, thus they should face generally in such direction.

Returning to the exemplary embodiment illustrated, wherein the shear bearing formations are arranged to transmit vertical shear loads, it can be seen, most notably in FIG. 5, that the transverse vertical dimension of pin member 58 can be substantially smaller than its transverse horizontal dimension, since pin member 58 is relied upon to transmit only horizontal shear loads (which are usually relatively low in the types of construction in question). Thus, a given locking system, comprising a male and female lock assembly, is capable of handling generally greater loads than were previously possible, without a corresponding increase in the overall size and weight of the pin members. Furthermore, by minimizing the vertical thickness of pins 58 and 58', it is possible to maximize the distance between their centers of gravity, and thereby better resist hinging action of the connected components on a horizontal axis.

Because of the use of tandem pairs of lock assemblies, the assemblies of each pair being vertically spaced, and further due to the use of pin members which are formed (preferably monolithically) of metal or like rigid material throughout, the locking system of the present invention is defined to positively prevent any substantial hinging, about a horizontal axis, as between adjacent connection components. This enables such components to be assembled into many types of structures which could not be properly formed with the articulated types of connections exemplified by certain prior art systems described hereinabove. Not only is it possible, with the present invention, to form more stable floating structures, such as bridges, drilling platforms, etc., but it is also possible to form non-floating structures such as land supported bridges and the like. Nevertheless, and again due to the rigidity of the pin members and their arrangement in vertical tandem pairs, it is not necessary to use unduly large force-transmitting parts in the lock assemblies, and in particular, all moving parts of the lock assemblies, including the pin members and the male and female lock means, are easily manually movable using simple hand tools. The planar configuration of the meshed shear bearing surfaces 101 and 110 further resists any such hinging action.

Another feature which enhances the load handling characteristics of the apparatus is the fact that each of the housings 34 and 46 is integral—preferably monolithic—and has a substantial front-to-rear dimension, i.e. includes a front wall which defines the respective socket means and a rear wall spaced from that front wall. Referring again to FIG. 3, it will be recalled that the weld lines 40 and 52 extend along a substantial front-rear extent of the respective housings 34 and 46. This differs from prior art arrangements in which a single plate-like socket (for a female assembly) or pin base (for a male assembly) was welded to the construction component. The new arrangement provides a better force distribution, and in particular, provides a welded attachment at a position spaced from the socket means, where substantial forces are felt, thereby lessening the chance of failure of one type or another.

All of the above force transmitting interrelationships in the upper assemblies 20 and 22 are duplicated in the analogous parts of the lower assemblies 20' and 22', so that the latter will not be further described in detail. However, it is noted that in FIG. 8, the meshing relationship between the shear bearing lugs 102' and 108' is further illustrated in elevation. If it is desired to separate the construction components which have been thus connected together, the upper female lock member 116 is raised to its release position, carrying the lower female lock member 117 with it via rods 124. The construction components can then be separated. To provide low profiles for any additional transport or handling of the components, the female lock members can then be relowered into their locking positions, but without any pin members disposed in their respective sockets.

To return the male lock assemblies to a low profile position, the upper male lock member 74 is first raised to its release position, carrying the lower member 75 therewith. Lower pin member 58' of the tandem pair of male lock assemblies is pushed rearwardly or inwardly to its retracted position and temporarily held there manually or by any suitable means. The interconnected lock members 74 and 75 are partially lowered, by striking the upper member 74. Because the rails 77 of lower male lock member 75 are longer than the rails 76 of upper male lock member 74, rails 77 will engage partially within grooves 62' of their respective pin member 58' while rails 76 of upper lock member 74 are still clear of their respective pin member 58. This will temporarily hold pin member 58' in its retracted position while pin member 58 is urged rearwardly to its retracted position. Then, while temporarily holding pin 58 in its retracted position, e.g. manually, the lock members 74 and 75 are further lowered to their full locking positions, wherein both pin members 58 and 58' are firmly locked in their retracted positions, and the locking assemblies 74, 82, 75 in turn is latched in place by engagement of spring 90 with the underside of the top wall of housing 34.

Figure 11:
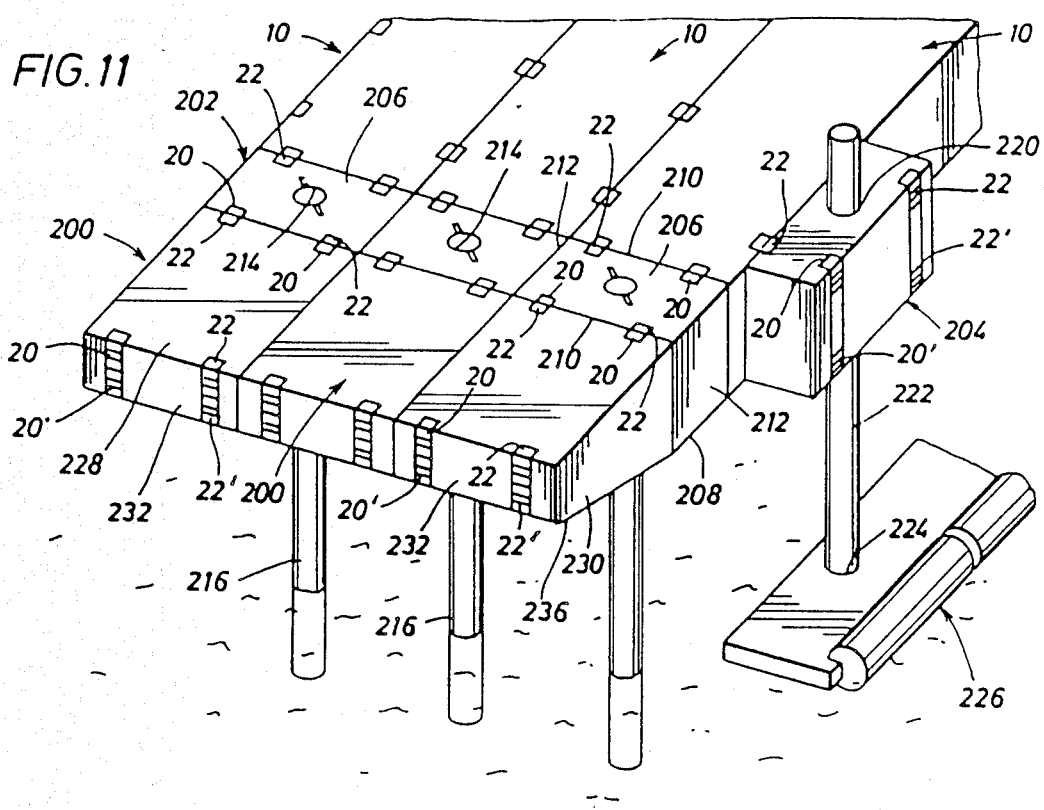
FIG. 11 is a perspective view of one end of a dock or pier of a type which can be constructed using the components and system of the present invention.
Figure 12:
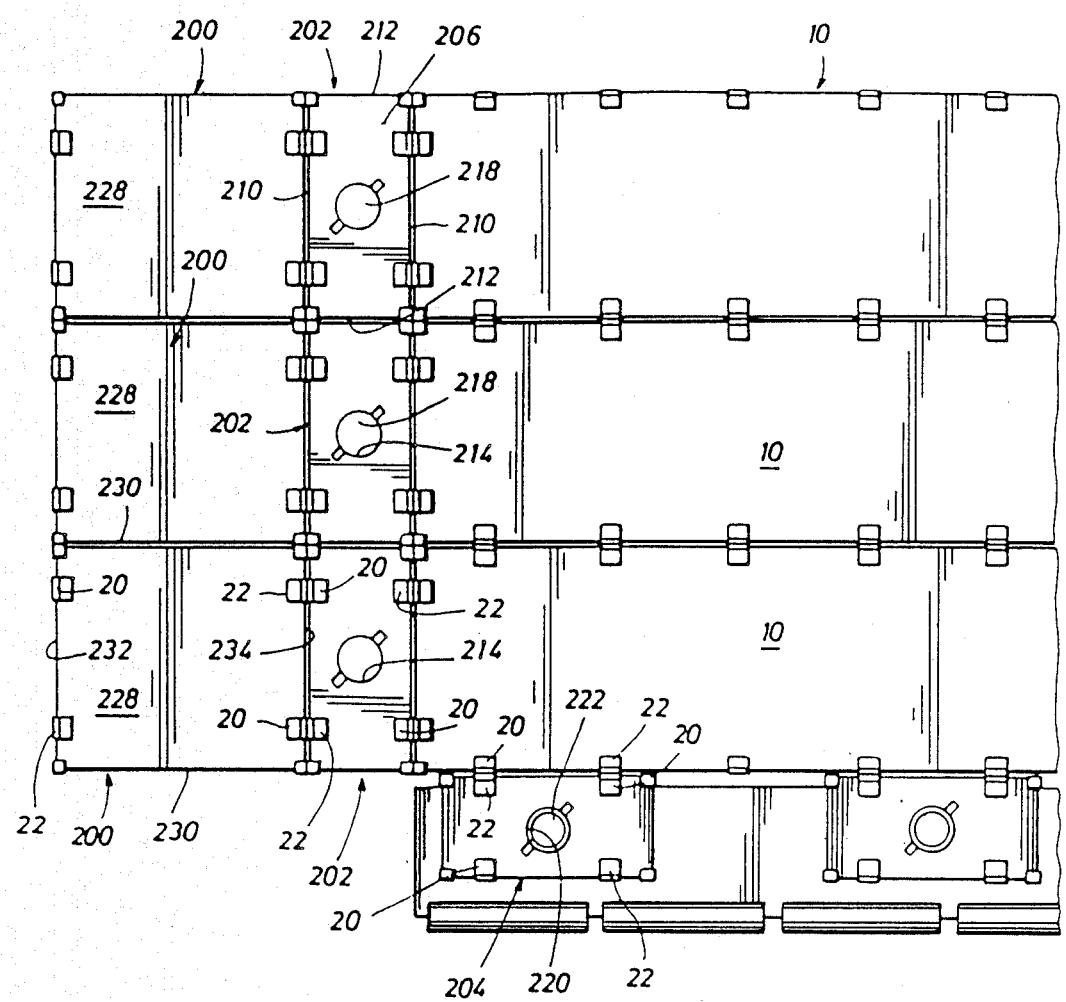
FIG. 12 is a top plan view of the pier of FIG. 11.
Figure 13:
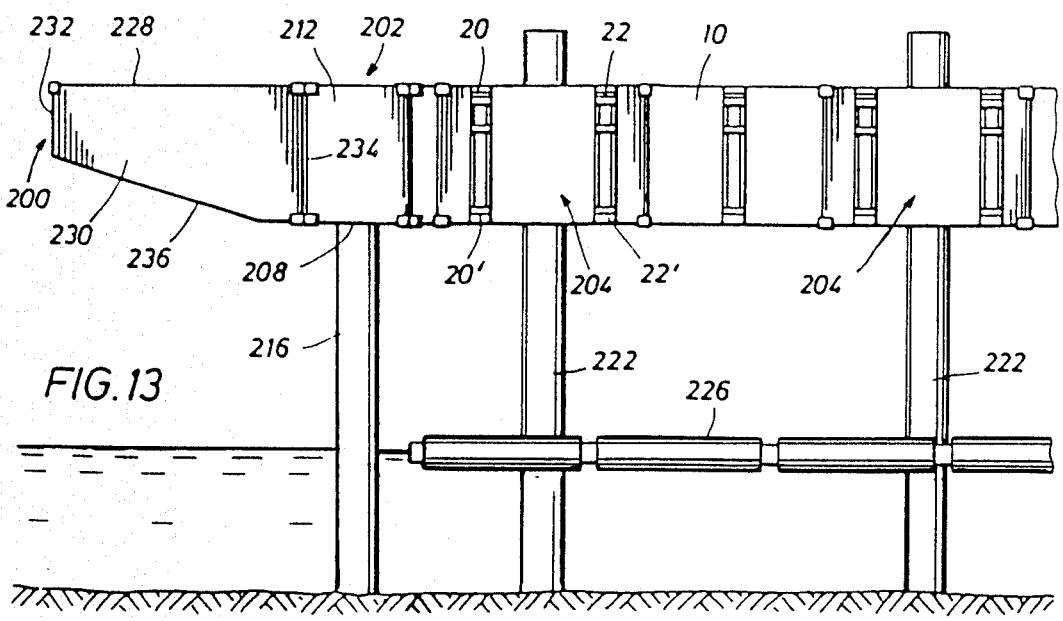
FIG. 13 is a side elevation view of the pier of FIG. 11.

In addition to the general components 10, a complete system according to the present invention may also include various specialized components. FIGS. 11–13 illustrate one end of a pier or dock which has been constructed using general components 10 together with two types of smaller specialized components, i.e. rake components 200 and spud well components 202 and 204. Components 202 have bearing type spud wells, while components 204 have holding type spud wells. The difference in this regard is a difference in the function of the particular spud well component in the pier or dock, while the spud well components 202 and 204 are otherwise equivalent in terms of the manner in which they are connected to other components either in a construction project or in a transport assembly such as is described more fully below.

The structure of FIGS. 11-13 is only one example of the many uses which can be made of the construction components according to the present invention. In particular, a pier or dock has been constructed with the major portion of its length being formed by general components 10 arranged in spans three abreast. Only the outermost span is shown. It will be understood that there will be as many spans of general components 10 as necessary to construct the dock or pier to the desired length.

The bearing spud well components 202 are each in the form of a rectangular parallelepiped having a rectangular top 206, a bottom 208 and four lateral sides including two relatively long sides 210 lying opposite each other, and two shorter sides 212, likewise lying opposite each other. Each of the components 202 also has a well or throughway 214 extending vertically therethrough, i.e. through its top 206 and its bottom 208.

The longer sides 210 of components 202 each carry two pair of lock assemblies of the type described in detail hereinabove, more specifically, a vertically spaced pair of male lock assemblies, upper ones of which are shown at 20, and a pair of vertically spaced female lock assemblies, upper ones of which are shown at 22. Each of the male lock assemblies 20 lies directly across from a female lock assembly 22, and the spacing between the male and female lock assemblies on a given side 210 of the component is the same as the lateral spacing between pairs of lock assemblies on the general component 10.

Accordingly, each of the bearing spud well components 202 has one of its longer sides 210 connected to the end wall of a respective one of the general components 10 in the outermost span of the pier. Elongate spuds in the form of pilings 216 extend through the wells 214 of respective components 202 and into load bearing relation with the bottom of the body of water over which the pier lies. An interlocking means 218, is installed in each well 214 to interlock the respective component 202 to the respective spud 216, so that the weight of components 202 and adjacent components to which they are attached is borne by the spuds 216. Suitable interlocking devices are well known in the art. Alternatively, spuds 216 might simply be pinned or welded to components 202. Therefore, members 218 have been shown only diagrammatically, and will not be described in detail herein.

FIGS. 11-13 show only one span of bearing spud well components 202. It should be understood that, throughout the length of the pier or dock whose outer end is shown in the figures, spans of bearing spud well components 202 could be interconnected between spans of general components 10 to provide load bearing capacity at as many points as necessary along the length of the pier. As alternatives to, or in conjunction with such spans of bearing spud well components, and depending on the parameters of the pier or other structure, bearing spud well components 202 could be used at the outboard sides of the spans of general components 10.

Holding spud well component 204 is virtually identical to the bearing spud well components 202, except that its well 220 need not be adapted to cooperate with an interlocking member to allow the vertical load of the component to be placed on the spud 222 which extends through well 220. Rather, the well 220 need only laterally retain or hold spud 222. Spud 222 in turn extends through a hole 224 of a floating bumper member 226 and into the floor of the body of water therebelow. Thus, spuds 222 laterally position bumper member 226 with respect to the pier and also laterally position the pier with respect to the floor of the body of water. Bumper 226 provides an appropriate abutment for vessels docking at the pier.

In every other respect, component 204 is identical to component 202, and in particular, includes the same number and arrangement of male and female lock assemblies 20, 20', 22 and 22', whereby it is connected to the outermost side of one of the general components 10.

A respective rake component 200 is connected to the outermost side 210 of each of the load bearing spud well components 202. Each rake component 200 has a rectangular top 228 and four lateral sides lying perpendicular to top 228, more specifically, a pair of opposite longer sides 230 and a pair of shorter sides 232 and 234. The bottom 236 of each of the rake components 200 is tapered or graduated, so that the rake component has a deep end adjacent side 234, of the same depth as the other components 10, 202 and 204, and a shallow end adjacent side 232, which forms the outermost extremity of the pier or dock. As used herein, the term "rake component" will generally refer to the types of components illustrated at 200 as well as to ramp-like components which are tapered even more to form a more nearly pointed shallow end.

Side 234 of each rake component 200 has a pair of vertically spaced male lock assemblies 20 and 20', and a pair of vertically spaced female lock assemblies 22 and 22'. The vertical spacing of the lock assemblies in each such pair is the same as that between the components of the various tandem pairs described thus far, and the lateral spacing between the male and female components on side 234 is likewise similar to the lateral spacing between adjacent pairs of lock assemblies in the components described hereinabove. Thus, each rake component 200 can be locked to a respective bearing spud well component 202 as illustrated.

The side 232 of the rake component 200 adjacent the shallow end thereof likewise carries a tandem pair of male lock assemblies 20 and 20' and a tandem pair of female lock assemblies 22 and 22'. Because of the shallow depth of the adjacent end of the rake component, the lock assemblies in each of the two pair carried on side 232, while still vertically spaced apart, are not spaced by as great a distance as the lock assemblies in the other pairs described thus far. This is not disadvantageous in the dock or pier structure, since rake components 200 usually either define a free end of such a structure, as shown, or are connected, shallow end to shallow end, with similar rake components.

A major use of the lock assemblies on side 232 of the rake component 200 is in connecting two such rake components together to form a transport assembly. A preferred form of such a transport assembly is shown in FIGS. 14 and 15. It can be seen that two rake components 200 have been connected together, with their sides 232 facing each other, utilizing the lock assemblies 20, 20', 22 and 22' on those sides. Even though the lock assemblies affecting this connection are not spaced apart vertically by as great a distance as the other lock assemblies described thus far, the facts that they are at least somewhat vertically spaced, that their pin members are rigid, and that they include the shear bearing formations in their housings as described hereinabove, enable them to connect the two rake components 200 in such a manner that they will not pivot relative to one another.

Thus, the transport assembly of FIGS. 16 and 17 can be lifted and otherwise handled in the same manner as a standard freight container. In particular, the maximum value of that dimension of each rake component 200 which is measured horizontally parallel to sides 232 and 234, e.g. adjacent top 228, is generally equal to the width of a standard freight container. A second dimension of each component 200, measured perpendicular to the first dimension, but likewise horizontally, i.e. parallel to sides 230, has a maximum value, adjacent top 228, generally equal to one half the length of a standard freight container. Thus, when the two components 200 are connected as shown to form the transport assembly, its gross dimensions generally correspond to those of a standard freight container. As previously explained, for most current container handling apparatus and the like, the third of the three mutually perpendicular dimensions, i.e. the vertical depth, need not be standardized, but can be chosen as desired.

FIGS. 16 and 17 show another transport assembly of two rake components which might be used, for example, if the rake components in question have their shallow ends equipped with some type of fitting or accoutrement, diagrammatically illustrated at 242, which protrudes horizontally from the shallow end, and thereby prevents the shallow ends of the two components from being directly connected together by their lock assemblies. On the other hand, the scheme of FIGS. 16 and 17 could also be used where it is desired to handle, in the manner of a standard freight container, an assembly of two rake components, where the length of each such component is somewhat less than half the length of a standard freight container.

More specifically, the transport assembly of FIGS. 16 and 17 comprises two rake components 200', which are identical to components 200 except in size and except for the provision of fittings 242. To form the transport assembly, the two components 200' are placed with those sides 232' which lie adjacent their respective shallow ends, facing each other, but not abutting. Sides 232' are connected by means of the male and female lock assemblies carried thereon, but rather than being directly connected, they are connected by spacers in the form of struts 244. Each strut 244 has a pair of male lock assemblies 20 and 20' at one end thereof, and a pair of female lock assemblies 22 and 22' at the opposite end. The pairs of lock assemblies on struts 244 are vertically spaced by the same distance as the lock assemblies in the pairs carried on sides 232' of the rake components. Thus, each strut 244 has one end connected to a pair of lock assemblies on one of the rake components 200', and the other end connected to a pair of lock assemblies on the other of the two rake components 200'.

The length or second dimension of each of the components 200', i.e. that dimension which is measured horizontally and parallel to sides 230', is less than half the length of a standard freight container, but greater than one-third the length of a standard freight container. The length of the spacers or struts 244 is chosen so that the length of the complete transport assembly is generally equal to that of a standard freight container. As in the preceding embodiment, the first dimension, measured horizontally parallel to sides 232' and 234', has a maximum value (and in this case a constant value) approximately equal to the width of a standard freight container.

Figure 18:
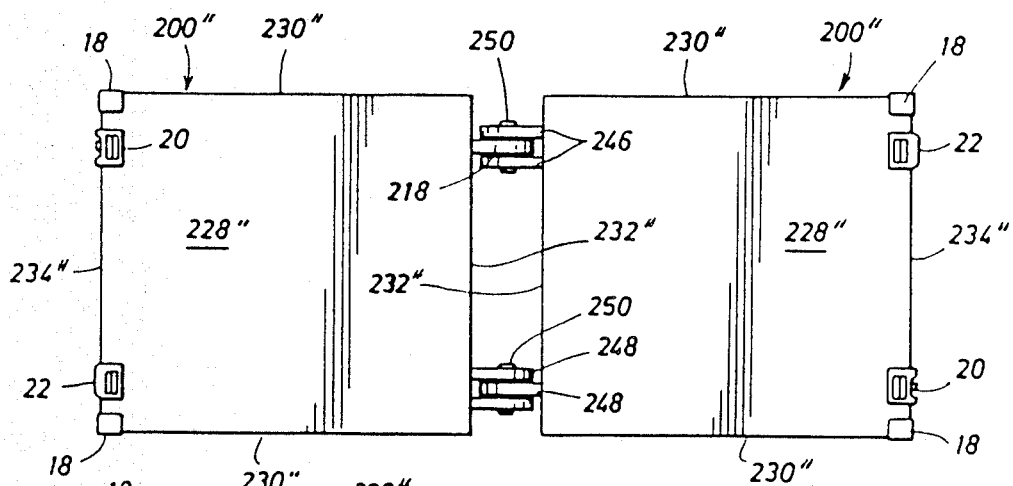
FIG. 18 is a top plan view of a third embodiment of transport assembly comprising two rake components.
Figure 19:
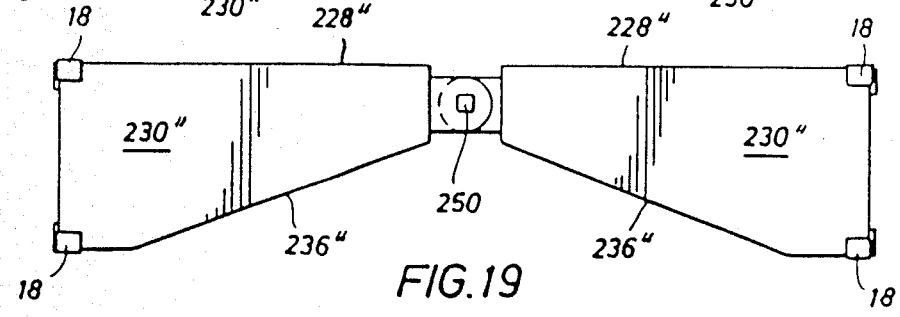
FIG. 19 is a side elevation view of the transport assembly of FIG. 18.

Although it is sometimes preferable to utilize lock assemblies of the type employed in connecting the components together for construction purposes for the dual purpose of connecting the components together in transport assemblies, it is feasible to use other forms of connection means, particularly at the shallow ends of two rake components, since such ends are frequently not connected to other components in the structure ultimately to be constructed. Thus, an alternative embodiment is illustrated in FIGS. 18 and 19. In that embodiment, the transport assembly includes two rake components 200" which, except for length and manner of connection in the assembly, are identical to components 200. The sides 232" of these modified components adjacent their shallow ends carry, toward one lateral edge, a clevis 246, and toward the other lateral edge, a tongue 248. When the components 200" are placed with their sides 232" facing each other, each tongue 248 can be received in the clevis 246 of the opposite component. Then, the tongues and clevises can be pinned together by pins 250, held in place in any suitable manner, as well known in the art. To brace the assembly against relative pivoting of the two components, pins 250 and the mating holes in tongues 248 and clevises 246 are square in transverse cross section. Suitable bracing members may be used to supplement the anti-pivoting effect of pins 250.

Once again, the first dimension of each component 200", measured horizontally and parallel to sides 232" and 234", has a maximum value approximately equal to the width of a standard freight container. The second dimension of each component 200", measured horizontally and parallel to sides 230", has a maximum value, adjacent top 228", slightly less than half the length of a standard freight container. The dimensions of the tongue and clevis connections 246, 248, when mated, and measured in the same direction as said second dimension, is such as to make the overall length of the transport assembly approximately equal to that of a standard freight container.

Referring finally to FIGS. 20 and 21, there is shown a transport assembly comprised of spud well components. The assembly illustrated is comprised of bearing spud well components 202. However, it will be appreciated that similar assemblies could be formed utilizing holding spud well components 204, or combinations of the two types of spud well components.

As previously mentioned, the dimension, i.e. first dimension, of each component 202 which is measured horizontally and parallel to its longer sides 210, is equal to the width of a standard freight container. Said sides 210 of the components are also the sides which carry the lock assemblies 20, 20', 22 and 22'. Thus, by placing a set of components 202 in alignment, with each component having a side 110 facing a similar side of the next component or components, and by choosing an appropriate number of the components 202, an assembly can be built up to have gross dimensions generally corresponding to those of a standard freight container. It is particularly convenient to simply connect adjacent components together utilizing the same lock assemblies 20, 20', 22 and 22', which are used to connect the components to other components in construction jobs. As was the case with the rake components 200, any male lock assemblies which are facing outwardly and unused in the transport assembly, should have their pins placed in the retracted or low profile positions.

It is particularly convenient to design the components 202 so that their second dimensions, measured horizontally parallel to short sides 212, is approximately one-fifth the length of a standard freight container. Thus, when five of these components are connected together as shown, the overall length of the resulting transport assembly is approximately equal to that of a standard freight container. Since each of the components 202 is already generally in the form of a rectangular parallelepiped, such sizing permits the assembly to be formed without the need for spacers or the like.

Of course, other relative sizing arrangements are possible. For example, the shorter of the horizontal dimensions of each component could be made approximately one-fourth the length of a standard freight container, with four components being connected together to form each transport assembly. In any event, however, and whether referring to the spud well type components or the rake components, or even other types of specialized components, the requirements for sizing can be generalized as follows:

Each such component must have a first horizontal dimension with a maximum value generally equal to $C_1/x$, where $C_1$ is the width of a standard freight container, and x is less than or equal to 1. In other words, the first dimension of each component must be less than or equal to the width of the standard freight container. However, in order to minimize or even avoid the need for spacers, frame members and the like, it is highly preferable that x be an integer, and in most cases, that x be equal to 1.

Each component should have a second horizontal dimension, measured perpendicular to the first dimension, having a maximum value generally equal to $C_2/y$, where $C_2$ is the length of a standard freight container, and y is less than 1, i.e. that the second dimension of the component be less than the length of a standard freight container. It is highly preferable that y be less than or equal to 2, so that at least two such components can be joined together in each transport assembly, and it is even more highly preferable that y be an integer, again to minimize the need for supplemental elements for the transport assembly, e.g. spacers.

It can be seen that virtually the entire construction system, including all types of construction components described hereinabove, can be shipped to a construction site in the manner of standard freight containers. Specifically, each of the general components 10 can be shipped and handled as a single freight container, while the rake components 200 can be formed into transport assemblies by twos, and the spud well components 202 and 204 can be formed into transport assemblies by fives. Each such transport assembly is likewise shipped and handled in the manner of a standard freight container, but without the need for trying to place these components within actual freight containers. Other small components, such as parts of the bumper 226, can be shipped within standard freight containers, or in any other suitable manner, while the spuds, 216 and 222, being simple pilings, can be shipped in some conventional manner, or in many instances obtained locally at the construction site. When the components have reached the construction site, the various transport assemblies are disconnected or broken down into individual components, and the components are then reassembled to form a structure, only one example of which has been described and illustrated in FIGS. 11–13.

The foregoing describes exemplary embodiments of the present invention. However, many modifications can be made within the skill of the art and the spirit of the invention. It is therefore intended that the scope of the invention be limited only by the claims which follow.

What is claimed is:

1. A transportation and construction method comprising the steps of:
    connecting together at least two construction components to form a transport assembly having gross dimensions generally corresponding to those of an ISO standard freight container, said two components being rake components each having a bottom which is graduated, whereby the rake component has a deep end and a shallow end, the two rake components being connected in said transport assembly with their shallow ends adjacent to and facing each other and their deep ends forming respective outer ends of the assembly;
    transporting the assembly to a construction site in the manner of an ISO standard freight container;
    disconnecting the components of the assembly; and
    reassembling said components with other components in a configuration different from the transport assembly, to form a structure.

2. The method of claim 1 wherein the rake components are connected to the remainder of said structure with their deep ends adjacent to the remainder of said structure and their shallow ends outermost.

3. A transportation and construction method comprising the steps of:
    connecting together at least two construction components to form a transport assembly having gross dimensions generally corresponding to those of an ISO standard freight container, said two components being spud well components each having a generally rectangular parallelepiped configuration with opposite sides, the length of which is equal to the width of an ISO standard freight container, and also having a throughway from top to bottom for receipt of an elongate spud, the spud well components being oriented and locked together in said transport assembly with respective sides adjacent to and facing each other, and with said throughways lying generally parallel to one another;
    transporting the assembly to a construction site in the manner of an ISO standard freight container;
    disconnecting the components of the assembly; and
    reassembling said components with other components in a configuration different from the transport assembly, to form a structure.

4. The method of claim 3 wherein each spud well component has opposite ends shorter than its sides; and more than two such spud well components are connected side by side in said transport assembly.

* * * * *

UNITED STATES PATENT AND TRADEMARK OFFICE
CERTIFICATE OF CORRECTION

PATENT NO. : 4,928,616
DATED : May 29, 1990
INVENTOR(S) : Alces P. Robishaw et al It is certified that error appears in the above-identified patent and that said Letters Patent is hereby corrected as shown below:

ON TITLE PAGE: delete

"[73] Assignee: Robishaw Engineering, Inc., Houston, Tex.".

Signed and Sealed this

Nineteenth Day of November, 1991

Attest:

HARRY F. MANBECK, JR.

*Attesting Officer*     *Commissioner of Patents and Trademarks*